(12) United States Patent
Hauck et al.

(10) Patent No.: US 7,264,101 B2
(45) Date of Patent: Sep. 4, 2007

(54) START-UP CLUTCH AND TORSIONAL-VIBRATION DAMPER ASSEMBLY

(75) Inventors: Hans Juergen Hauck, Karlsruhe (DE); Michael Schaefer, Schwetzingen (DE); Johannes Heinrich, Friedrichsdorf (DE); Dietmar Strauss, Kraichtal (DE)

(73) Assignee: BorgWarner Inc., Auburn Hills, MI (US)

( * ) Notice: Subject to any disclaimer, the term of this patent is extended or adjusted under 35 U.S.C. 154(b) by 230 days.

(21) Appl. No.: 11/076,256

(22) Filed: Mar. 9, 2005

(65) Prior Publication Data

US 2005/0224308 A1 Oct. 13, 2005

(30) Foreign Application Priority Data

Apr. 10, 2004 (EP) ................... 04008678

(51) Int. Cl.
*F16D 47/02* (2006.01)
*F16D 13/72* (2006.01)

(52) U.S. Cl. .............. 192/55.61; 192/70.12; 192/70.17; 192/212; 192/113.36

(58) Field of Classification Search .......... 192/55.61
See application file for complete search history.

(56) References Cited

U.S. PATENT DOCUMENTS

| | | | |
|---|---|---|---|
| 1,233,561 A | 7/1917 | Dornfeld | |
| 1,842,039 A * | 1/1932 | Matthews | 192/55.61 |
| 2,174,395 A | 9/1939 | Aikman | 188/153 |
| 2,639,013 A | 5/1953 | Meschia | 192/70.22 |
| 2,919,778 A | 1/1960 | Aschauer | 192/86 |
| 3,171,522 A | 3/1965 | Petrie et al. | 192/69 |
| 3,534,842 A | 10/1970 | Davison, Jr. | 192/113 |
| 3,537,556 A | 11/1970 | Pfeffer | 192/70.28 |
| 3,612,237 A | 10/1971 | Honda | 192/85 |
| 3,654,692 A | 4/1972 | Goetz | 29/558 |
| 3,834,503 A | 9/1974 | Maurer et al. | 192/113 |
| 3,858,698 A | 1/1975 | Hause | 192/89 |
| 4,081,065 A | 3/1978 | Smyth et al. | 192/0.076 |
| 4,205,739 A | 6/1980 | Shelby et al. | 192/113 |
| 4,219,246 A | 8/1980 | Ladin | 308/219 |
| 4,270,647 A | 6/1981 | Leber | 192/113 |
| 4,301,904 A | 11/1981 | Ahlen | 192/70.12 |
| 4,361,060 A | 11/1982 | Smyth | 74/866 |
| 4,372,434 A | 2/1983 | Aschauer | 192/85 |
| 4,501,676 A | 2/1985 | Moorhouse | 252/12 |
| 4,548,306 A | 10/1985 | Hartz | 192/70.28 |
| 4,585,105 A * | 4/1986 | Iio et al. | 228/139 |

(Continued)

FOREIGN PATENT DOCUMENTS

DE 871 857 7/1949

(Continued)

*Primary Examiner*—Richard M. Lorence
(74) *Attorney, Agent, or Firm*—Bliss McGlynn, P.C.

(57) ABSTRACT

A start-up clutch and torsional-vibration damper assembly including a disk clutch having an outer disk carrier and an inner disk carrier, and a torsional vibration damper having a primary element, a secondary element, and a spring dampening mechanism. The spring dampening mechanism is disposed between and operatively couples the primary element and the secondary element. The torsional vibration damper connected in series to the disk clutch such that the torsional vibration damper and the disk clutch are juxtaposed to each other along a common axis with the primary element having substantially the same outside radius as the outer disk carrier.

13 Claims, 9 Drawing Sheets

U.S. PATENT DOCUMENTS

| | | | |
|---|---|---|---|
| 4,646,891 A | 3/1987 | Braun | 192/0.032 |
| 4,667,534 A | 5/1987 | Kataoka | 74/711 |
| 4,667,798 A | 5/1987 | Sailer et al. | 192/70.12 |
| 4,700,823 A | 10/1987 | Winckler | 192/107 |
| 4,802,564 A | 2/1989 | Stodt | 192/70.28 |
| 4,808,015 A | 2/1989 | Babcock | 384/609 |
| 4,827,784 A | 5/1989 | Muller et al. | 74/330 |
| 5,174,420 A | 12/1992 | DeWald et al. | 188/264 |
| 5,232,411 A | 8/1993 | Hayashi et al. | 475/146 |
| 5,275,267 A | 1/1994 | Slicker | 192/0.033 |
| 5,284,232 A | 2/1994 | Prud'Homme | 192/70.21 |
| 5,305,863 A | 4/1994 | Gooch et al. | 192/70.12 |
| 5,383,544 A | 1/1995 | Patel | 192/70.28 |
| 5,439,088 A | 8/1995 | Michioka et al. | 192/85 |
| 5,450,934 A | 9/1995 | Maucher | 192/70.25 |
| 5,469,943 A | 11/1995 | Hill et al. | 188/264 |
| 5,495,927 A | 3/1996 | Samie et al. | 192/70.12 |
| 5,499,704 A | 3/1996 | Hays | 192/89.23 |
| 5,505,286 A | 4/1996 | Nash | 192/70.27 |
| 5,538,121 A | 7/1996 | Hering | 192/70.12 |
| 5,577,588 A | 11/1996 | Raszkowski | 192/113.35 |
| 5,613,588 A | 3/1997 | Vu | 192/113.35 |
| 5,634,541 A | 6/1997 | Maucher | 192/70.25 |
| 5,755,314 A | 5/1998 | Kanda et al. | 192/70.12 |
| 5,899,310 A | 5/1999 | Mizuta | 192/107 |
| 5,908,100 A | 6/1999 | Szadkowski et al. | 192/214.1 |
| 5,918,715 A | 7/1999 | Ruth et al. | 192/46 |
| 6,000,510 A | 12/1999 | Kirkwood et al. | 192/3.29 |
| 6,026,944 A | 2/2000 | Satou et al. | 192/70.28 |
| 6,071,211 A | 6/2000 | Liu et al. | 477/175 |
| 6,116,397 A | 9/2000 | Kosumi et al. | 192/89.23 |
| 6,189,669 B1 | 2/2001 | Kremer et al. | 192/70.12 |
| 6,217,479 B1 | 4/2001 | Brown et al. | 477/86 |
| 6,244,407 B1 | 6/2001 | Kremer et al. | 192/70.12 |
| 6,299,565 B1 | 10/2001 | Jain et al. | 477/143 |
| 6,332,521 B1 * | 12/2001 | Shoji | 192/55.61 |
| 6,419,062 B1 | 7/2002 | Crowe | 192/89.23 |
| 6,564,917 B2 * | 5/2003 | Katou et al. | 192/70.14 |
| 6,868,949 B2 | 3/2005 | Braford, Jr. | 192/55.61 |
| 2002/0014386 A1 | 2/2002 | Diemer et al. | 192/70.14 |
| 2003/0057051 A1 | 3/2003 | Alfredsson | 192/87.15 |
| 2003/0075413 A1 | 4/2003 | Alfredsson | 192/87.15 |
| 2003/0085094 A1 * | 5/2003 | Miyoshi et al. | 192/70.12 |
| 2003/0178275 A1 | 9/2003 | Breier et al. | 192/3.29 |
| 2004/0016317 A1 * | 1/2004 | Bauer et al. | 74/574 |
| 2004/0050647 A1 * | 3/2004 | Hayabuchi et al. | 192/212 |
| 2004/0060793 A1 | 4/2004 | Dacho et al. | 192/3.29 |
| 2005/0087420 A1 * | 4/2005 | Schafer et al. | 192/55.61 |

FOREIGN PATENT DOCUMENTS

| | | |
|---|---|---|
| DE | 953 406 | 11/1956 |
| DE | 1 217 800 | 5/1966 |
| DE | 31 18 565 A1 | 11/1982 |
| DE | 3149 880 C2 | 4/1985 |
| DE | 35 32 759 C1 | 3/1987 |
| DE | 100 34 677 A1 | 2/2002 |
| DE | 100 49 474 A1 | 4/2002 |
| DE | 197 00 635 C2 | 6/2002 |
| DE | 101 15 454 A1 | 8/2002 |
| DE | 101 43 834 A1 | 3/2003 |
| EP | 0 762 009 A1 | 3/1997 |
| EP | 0 848 179 A1 | 6/1998 |
| FR | 71.03411 | 9/1972 |
| JP | 4-366032 | 12/1992 |
| JP | 8-2000393 | 8/1996 |
| JP | 2003063261 A * | 3/2003 |
| JP | 2004001708 A * | 1/2004 |
| WO | WO99/45289 | 9/1999 |

* cited by examiner

START-UP CLUTCH AND TORSIONAL-VIBRATION DAMPER ASSEMBLY

BACKGROUND OF THE INVENTION

1. Field of the Invention

The present invention relates, generally, to a clutch assembly, and more specifically, to a start-up clutch and torsional-vibration damper assembly for translating torque between a prime mover and a transmission.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive power demand of the vehicle. Hydrokinetic devices, such as torque converters, are often employed between the internal combustion engine and its associated automatic transmission for transferring kinetic energy therebetween.

Torque converters typically include impeller assemblies that are operatively connected for rotation with the torque input from an internal combustion engine, a turbine assembly that is fluidly connected in driven relationship with the impeller assembly, and a stator or reactor assembly. These assemblies together form a substantially toroidal flow passage for kinetic fluid that circulates in the torque converter. Each assembly includes a plurality of blades or veins that act to convert mechanical energy to hydrokinetic energy and back to mechanical energy. The stator assembly of a conventional torque converter is locked against rotation in one direction but is free to spin about an axis in the direction of rotation of the impeller assembly and the turbine assembly. When the stator assembly is locked against rotation, the torque is multiplied by the torque converter. During torque multiplication, the output torque is greater than the input torque for the torque converter. However, when the stator assembly freewheels in the direction of rotation of the impeller and turbine assemblies, there is no torque multiplication and the torque converter becomes a fluid coupling. Fluid couplings have inherent slip. In the absence of a fully engaged lock-up clutch, torque converter slip exists when the speed ratio is less than 1.0 (RPM input>RPM output of the torque converter). This inherent slip reduces the efficiency of the torque converter.

While torque converters provide a smooth coupling between the engine and the transmission, the slippage of the torque converter results in parasitic losses that decrease the efficiency of the entire power train. More specifically, the operating efficiency of the converter during start-up is relatively low. It varies from a zero value at stall to a maximum value of approximately 80-85% at the coupling point. The coupling point occurs at the transition from the torque multiplication mode to the coupling mode when the torque multiplication ratio is unity.

In addition to the problems with efficiency, torque converters of the type known in the related art occupy substantial space in the driveline assembly between the transmission gearing and the engine. Torque converters typically define relatively large diameters when compared to the transmission gearing. Further, the torque converter has a substantial rotating mass that must be accelerated by the engine during start-up of the vehicle during forward drive or in reverse drive. The effective mass of the converter necessarily includes the mass of the hydraulic fluid that circulates in the torus circuit defined by the converter impeller, the turbine, and the stator assembly.

On the other hand, frictional clutches have been also employed in the related art to selectively connect a source of rotational power, such as the crank shaft of an internal combustion engine and its flywheel, to a driven mechanism, such as a transmission. The frictional clutches of the type that have been employed in the related art overcome the disadvantages associated with reduced efficiencies, parasitic losses, relatively large effective mass and the space that is occupied by torque converters used for the same purpose. In an automotive context, clutches used for this purpose are often referred to as "start-up" clutches. Clutches of this type typically include a clutch pack that is operatively supported between a drive and driven member of the clutch assembly. The drive member is operatively connected to the torque input from the prime mover. The driven member is operatively connected to the input shaft of the transmission.

In addition, some start-up clutches include a series connected, torsional-vibration dampers incorporated between the clutch pack and the output to the input of the transmission. A torsional-vibration damper is, generally, a type of elastic coupling disposed between the two main components of drive train of a vehicle (i.e., the engine and the transmission). Such devices reduce or otherwise prevent vibrations from being transmitted from the engine to other parts of the drive train.

The basic embodiment of a torsional-vibration damper includes a primary element and a secondary element that are coupled to each other through a spring dampening device and are limited in movement in relation to each other about a rotational axis. The spring device advantageously includes a plurality of springs disposed on a radial arc spaced relative to the rotational axis and, preferably, at a certain uniform distance from each other. The springs, or a sequence of multiple springs, if applicable, are then connected to the primary element on one side of the springs and to the secondary element on the other side of the springs. Torque is transmitted through the spring coupling, and, as a result of the spring characteristic, a certain additional damping effect is achieved.

In contrast to the aforementioned torque converters, combining a start-up clutch with a torsional vibration damper provides the additional advantages of smoother operation and ride characteristics for the vehicle, while reducing impact loading on driveline components thereby extending the life of the components. However, in conventional applications, the combination of a start-up clutch and a torsional vibration damper loses most of the space saving and mass reduction advantages of the start-up clutch alone versus a torque converter. Up to this point, the trade off of mass and space taken up when employing a combined start-up clutch and torsional vibration damper has been tolerated. However, as the progression toward lighter, smaller, and more efficient vehicle driveline components continues, the general size and mass of the conventional start-up clutch and torsional-vibration damper has become less tolerable and has proven to be a limitation to greater drive line efficiency.

Furthermore, early attempts at producing more compact start-up clutch and torsional-vibration damper assemblies have found that a smaller, more compact device must deal with larger frictional loads and thereby much higher heat dissipation to transfer the same torque loading as conventional devices. Thus, to this point, attempting to achieve a higher level of efficiency by reducing component size and weight of combined start-up clutch and damper assemblies has been problematic due to the excessive heat that is generated and must be dissipated.

Accordingly, there remains a need in the related art for a start-up clutch and torsional vibration damper assembly that is radially and axially more compact than conventional designs to provide more efficiency and cost savings by occupying less space and having less weight than conventional designs. Furthermore, there remains a need in the art for a more compact and lighter start-up clutch and a torsional vibration damper assembly that is capable of dissipating the higher frictional heat output normally generated by these devices.

SUMMARY OF THE INVENTION

The disadvantages of the related art are overcome by a start-up clutch and torsional-vibration damper assembly that includes a disk clutch having an outer disk carrier and an inner disk carrier, and a torsional vibration damper having a primary element, a secondary element, and a spring dampening mechanism. The spring dampening mechanism is disposed between and operatively couples the primary element and the secondary element. The torsional vibration damper is connected in series to the disk clutch such that the torsional vibration damper and the disk clutch are juxtaposed to each other along a common axis with the primary element having substantially the same outside radius as the outer disk carrier.

In this manner, the costly and inefficient approaches of the prior art of combining conventional start-up clutches with conventional torsional vibration dampers are overcome by the present invention. The present invention provides a start-up clutch and torsional vibration damper assembly that is radially and axially more compact than conventional designs to provide more efficiency and cost savings by occupying less space and having less weight than conventional designs. Furthermore, the present invention provides a more compact and lighter start-up clutch and a torsional vibration damper assembly that is encompassed within an enclosed housing that provides a cooling media to dissipate the higher frictional heat output generated by this more compact and efficient design.

Other objects, features, and advantages of the present invention will be readily appreciated, as the same becomes better understood after reading the subsequent description taken in connection with the accompanying drawings

BRIEF DESCRIPTION OF THE DRAWINGS

FIG. 9a is an edge view of one of the friction disks of the multi-disk clutch of the start-up clutch and torsional-vibration damper assembly of the present invention; and FIG. 9b is a side view of the friction disk of the start-up clutch and torsional-vibration damper assembly of the present invention illustrated in FIG. 9a.

DETAILED DESCRIPTION OF THE PREFERRED EMBODIMENT(S)

Figure 1:
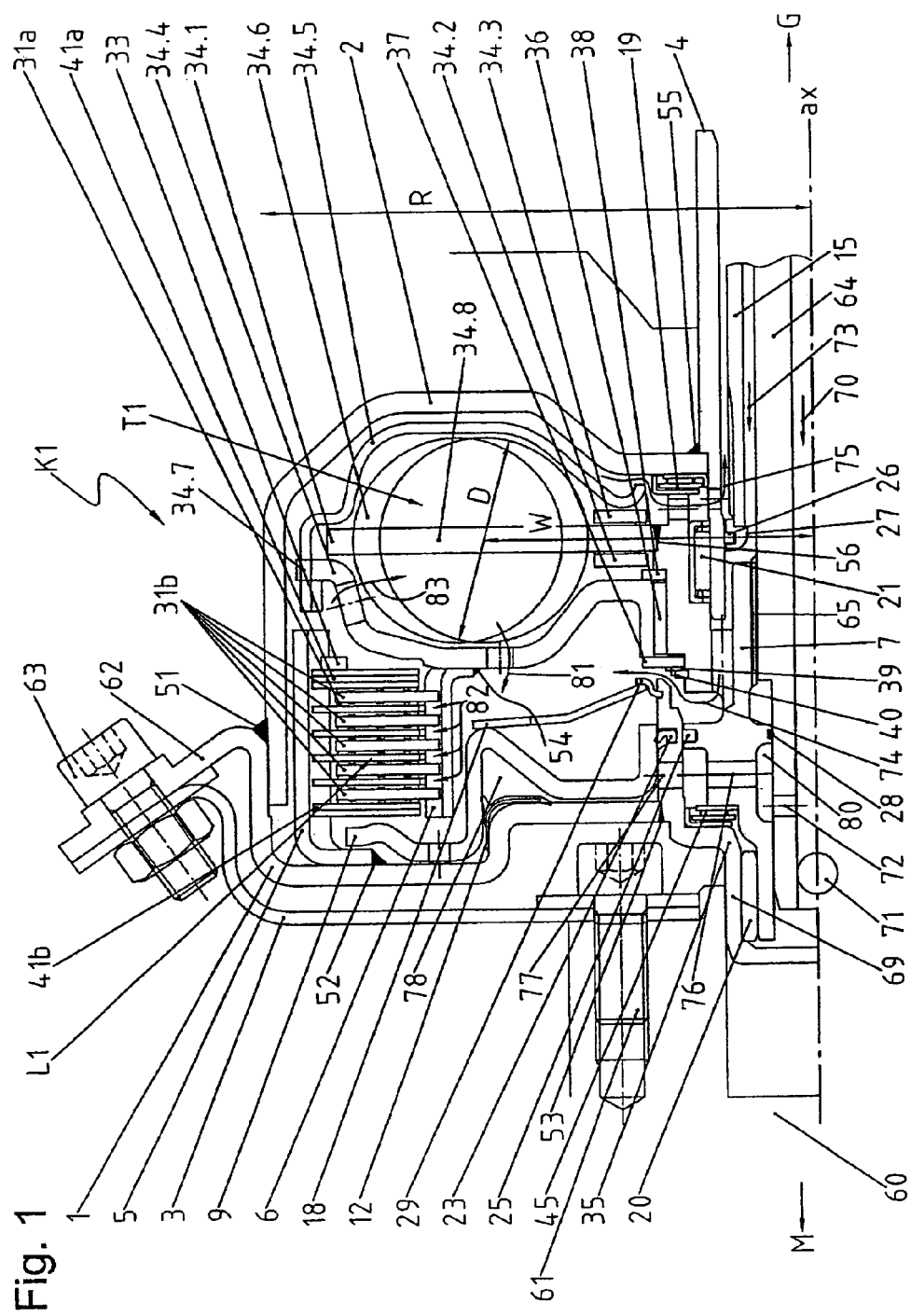
FIG. 1 is a cross sectional side view of a first embodiment of the start-up clutch and torsional-vibration damper assembly of the present invention.

The present invention relates, generally, to a clutch assembly, and more specifically, to a start-up clutch and torsional-vibration damper assembly for translating torque between a prime mover and a transmission. FIG. 1 shows a first embodiment of a start-up clutch and torsional-vibration damper assembly K1 in accordance with the invention. This start-up clutch and torsional-vibration damper assembly K1 consists of a disk clutch L1 and a torsional vibration damper T1. The disk clutch L1 and torsional vibration damper T1 are arranged next to each other in the axial direction, are connected in series, and have a common axis of rotation "ax". Thus, a torsional moment from a prime mover, such as an internal combustion motor M (not shown) for example, is first supplied to the disk clutch L1 and then the torsional vibration damper T1 before passing to a gearbox G (not shown).

The disk clutch L1 and the torsional vibration damper T1 are housed in a common closed clutch housing that consists of a first half shell 1 and a second half shell 2. Both half shells 1, 2 are joined together at weld joint 51. The first half shell 1 includes an outer ring 62 that extends diagonally outwardly from the central axis "ax". A flexible disk 3 is bolted in a known manner to this ring 62 by a plurality of bolts 63. Flexible disk 3 serves to balance radial misalignments, axial oscillations, and, if necessary, radial oscillations. At the inner perimeter, flexible disk 3 is mounted to a drive shaft of a prime mover. As illustrated, in this example, the flexible disk 3 is mounted by bolts 61 to the crankshaft 60 of the motor M. It should be appreciated that other means of attachment to a prime mover may be employed.

An input cylinder 35 is mounted to the first half shell 1 of the clutch housing at weld joint 53. At the motor end, the input cylinder 35 is operatively supported within an opening in the end of crankshaft 60. Those having ordinary skill in the art will appreciate that input cylinder 35 could also be a portion of the first half shell 1 rather than a separate piece. The disk clutch L1 further includes a gearbox inlet collar 7. The gearbox inlet collar 7 is supported at one end by input cylinder 35 through a guide bushing 20 at pilot surface 69. The other end of the gearbox inlet collar 7 is operatively mounted to a portion of the torsional vibration damper T1 at weld joint 56, as will be discussed in detail below. A guide bushing 4 is mounted to the second half shell 2 at weld joint 55. The guide bushing 4 operatively supports the gearbox inlet collar 7 through a radial bearing 21. It should be appreciated that a radial bearing could also be used in place of the guide bushing 20 and a guide bushing could be used in place of radial bearing 21.

The gearbox G includes an input shaft 64. The gearbox inlet collar 7 provides a torque-proof connection with the gearbox input shaft 64 by a splined interconnection at 65, such that the torque output through the start-up clutch and torsional-vibration damper assembly K1 is transferred to the gearbox G. An axial bearing 19 is provided between a radial wall of the second half shell 2 of the clutch housing and the gearbox inlet collar 7 to prevent axial movement of the gearbox inlet collar 7 toward the gearbox G. Similarly, axial bearing 45 is provided between a radial wall of the input cylinder 35 and the gearbox inlet collar 7 to prevent axial movement of the gearbox inlet collar 7 away from the gearbox G.

The disk clutch L1 is a multi-disk clutch pack, which includes a plurality of outer disks 31a mounted in an outer disk carrier 5 interspaced with a plurality of inner disks 31b mounted in an inner disk carrier 6. It should be appreciated that the two sets of disks may be formed of any of variety of structurally hard and resilient materials such as steel or other metallic alloys. In the preferred embodiment, the disks 31a and 31b are steel with the outer disks 31a further including a friction material adapted to frictionally engage the inner disks 31b.

The outer disk carrier 5 is welded to the first half shell 1 of the clutch housing at weld 52. The inner disk carrier 6 is welded to the torsional vibration damper T1 at weld 54. The outer disk carrier 5 also includes a pressure plate 41b and an end plate 41a that operatively enclose the clutch disks 31a and 31b. The end plate 41a is supported by in the outer disk carrier 5 by means of a retaining clip 33.

The disk clutch L1 also includes an actuation plate 9, which is supported on the by a retaining ring 29 connected axially to the input cylinder 35. The actuation plate 9 is adapted to selectively press against the pressure plate 41b. When the actuation plate 9 is actuated and pressed against the pressure plate 41b, the pressure plate 41b causes the outer and inner disks 31a and 32b to be pressed together against the end plate 41a in friction-relevant contact. This action operatively connects the outer disk carrier 5 to the inner disk carrier 6. This actuation plate 9 is kept in a non-actuated state due to the spring force of a disk return spring disk 18.

The torsional vibration damper T1 includes a primary element and a secondary element that is coupled with a plurality of springs such that the primary element is rotatable with respect to the secondary element. The primary element is a damper shell formed of two damper half shells 34.4, 34.5. On their outer perimeter, these damper half shells 34.4 and 34.5 have a claw or comb gearing 34.7, with which the damper shells are connected together in a torque-proof manner. The primary element is disposed about gearbox inlet collar 7 and is adapted to rotate with respect to the gearbox inlet collar 7 by means of a guide bushing 36 that supports the drive-side damper half shell 34.4. Any axial displacement of the damper half shells 34.4, 34.5 is prevented by means of two washer disks 37 and 38. It should be appreciated that a radial bearing could also be used in place of the guide bushing 36.

The secondary element is a flanged damper disk 34.1. The secondary element 34.1 is arranged axially between and is encompassed by the two damper half shells 34.4 and 34.5. The secondary element 34.1 is mounted at its inner circumference to the gearbox inlet collar 7 at weld joint 56. The spring device that operatively connects the primary element to the secondary element includes a plurality of coil springs 34.6 arranged circumferentially about the flanged damper disk 34.1 (secondary element). The flanged damper disk 34.1 is slotted to accommodate the springs such that radial legs, or drivers 34.8 extend radially outward and separate the individual springs. Similarly, the damper half shells 34.4 and 34.5 have axially opposite drivers (not shown) that are directed radially inward to engage the spring ends. In this manner, each coil spring 34.6 is supported at its ends by the radial drivers of the primary element, 34.4 and 34.5, and the radial drivers 34.8 of the secondary element 34.1.

Figure 8:
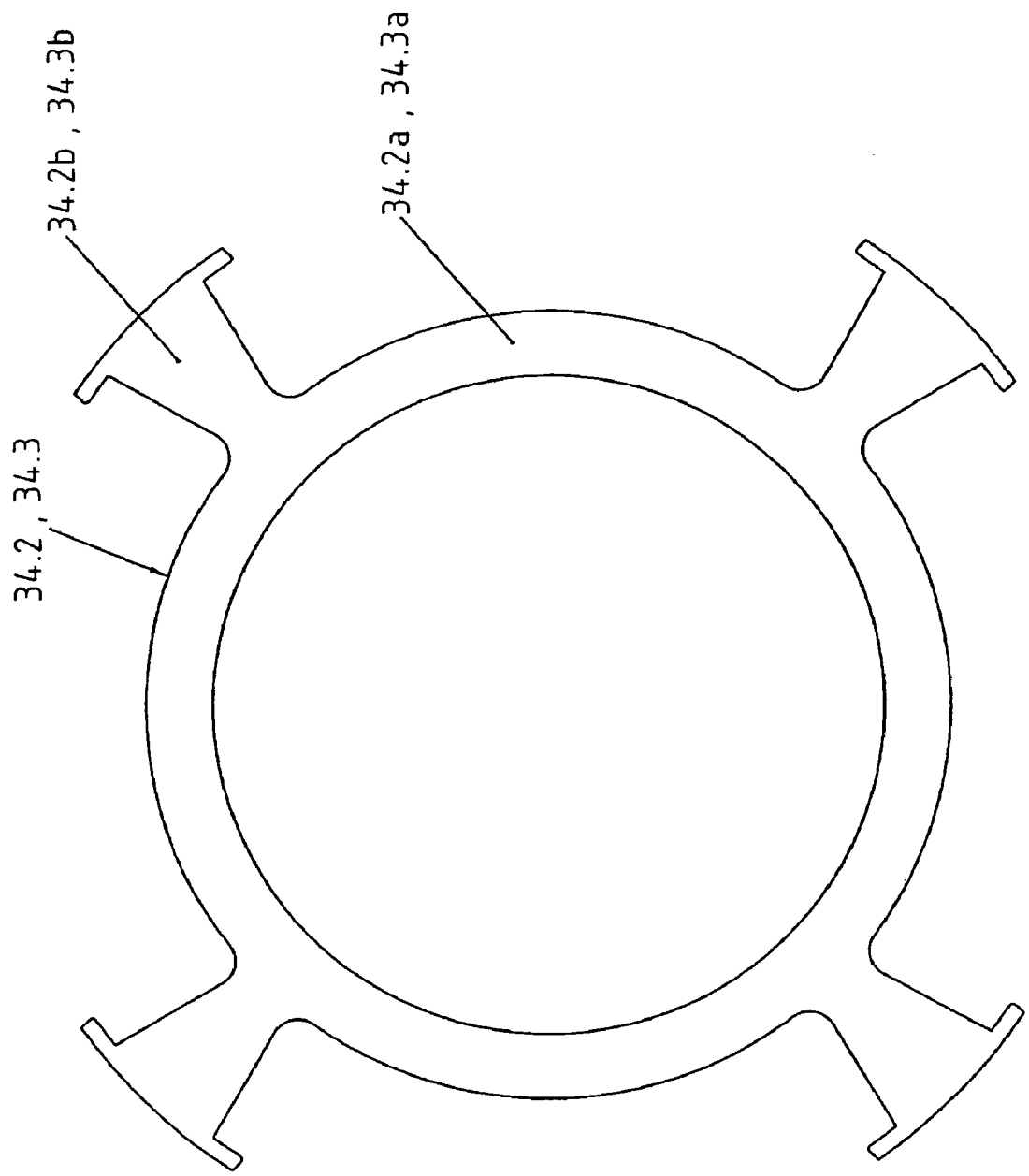
FIG. 8 is a side view of one of the spring separators of the torsional-vibration damper of the start-up clutch and torsional-vibration damper assembly of the present invention.

To additionally support the springs 34.6, spring separators, which series-connect the coil springs 34.6 together in the circumferential direction of the secondary element, are disposed on both sides of the flanged damper disk 34.1. This type of spring separator 34.2, 34.3 can be seen, for example, in FIG. 8. It consists of a ring 34.2a, 34.3a made of metal or plastic with spring support projections 34.2b, 34.3b that extend radially outwards.

In order to provide the most compact structure, and keep the installation space of the disk clutch L1 and torsional damper T1 as small as possible, the outer disk carrier 5 and the two damper half shells 34.4, 34.5 of the primary element have substantially the same outer radius R. Since the radial measurements of the torsional vibration damper T1 are generally dictated by the spring capacity required for each use case, the axial measurements of the disk clutch L1 are determined alone from the number of necessary clutch disks 31a, 31b in order to provide the corresponding clutch capacities. In the preferred embodiment, the ratio of spring diameter D and the working radius W resulting from the distance from the spring center to the rotation axis "ax" is set to 0.55. The coil springs 34.6 for achieving the small outer radius R of the disk clutch L1 are located on a correspondingly small working radius W, but sufficient spring capacity is ensured by a larger spring diameter D. It should be appreciated that the present invention may also be structured so that the secondary element 34.1 has substantially the same outer radius R as the outer disk carrier 5.

It should be further appreciated that in addition to sizing the working radius and spring diameter to control the damping effect of the torsional damper T1, additional torsional influence can be provided by the associated components, if necessary. For example, the radial bearing 36 and both washer disks 37 and 38 upon which the primary element operatively rotates can be supplied with a predetermined supplemental friction moment through the use of a spring element 39 between the washer disk 37 and the retaining clip 40.

Operationally, a torque moment provided by the motor M is fed into the clutch housing (half shells 1 and 2) through the flexible disk 3 and thereby to the outer disk carrier 5. If the actuating plate 9 has not been actuated and is held away from the pressure plate 41a by return spring disk 18, the outer and inner disks 31a and 32b do not engage each other. However, if the actuating plate 9 is actuated by a selectively applied hydraulic pressure, as will be discussed in detail below, the clutch disks 31a and 31b will engage so that torque is transferred to the primary element 34.4 and 34.5 of the torsional vibration damper assembly T1. The radial drivers of the primary element press upon the ends of the plurality of springs 34.6 and the spring separators 34.2, 34.4. The springs 34.6 compress a predetermined amount for the applied moment of torque and then transfer the force to the radial drivers 34.8 of the secondary element 34.1. The spring compression provides the dampening effect to the secondary element 34.1, which in turn rotates the gearbox inlet collar 7 and the gearbox inlet shaft 64 thereby providing the applied torque to the gearbox G.

To actuate the disk clutch L1, hydraulic pressure must be selectively provided to the actuation plate 9 to cause the clutch disks 31a and 31b to engage each other. In this embodiment, the gearbox inlet shaft 64 includes an open central bore 70 for the delivery of pressurized hydraulic fluid from a source to the start-up clutch and torsional-vibration damper assembly K1 as indicated by the arrow in FIG. 1. The central bore 70 is closed at the motor end by a ball plug 71 so that the flow of pressurized hydraulic fluid moves through paths 72, 80, 76, and 77 to reach pressure cavity 78. Gaskets 12, 23, 25 and 28 prevent leakage from this flow path. The selective pressure supplied to pressure cavity 78 drives the actuation plate 9 against the spring force of the disk spring 18 and against the pressure plate 41b, which in turn pushes the clutch disks 31a, 31b together and against the end plate 41a.

Since the start-up clutch and torsional-vibration damper assembly K1 is subjected to extreme heat stress during an initial vehicle movement, or startup, especially under heavy loading conditions, it is important to ensure good cooling of all friction elements, and in particular the outer and inner disks 31a, 31b. For this purpose, cooling fluid flows through the entire clutch housing (half shells 1 and 2). Although a different cooling media may be employed, in the preferred embodiment, the cooling fluid is the same as the hydraulic fluid that is selectively delivered to the actuator plate 9. It should be appreciated that this type of arrangement is generally referred to as a "wet" clutch.

To provide a constant flow of cooling media that is separate from the selective flow required to actuate the disk clutch L1, as described above, a secondary shaft 15 is employed to separate the in-coming and out-going cooling fluid streams. As shown in FIG. 1, the secondary shaft 15 is disposed radially between the gearbox inlet shaft 64 and guide bushing 4. Thus, the cooling fluid is supplied and discharged from the start-up clutch and torsional-vibration damper assembly K1 through corresponding channels that are located radially inside and outside of stator shaft 15. As shown in FIG. 1, the in-coming cooling fluid is supplied through channel 73, the out-going fluid is discharged through channel 75. More specifically, sealing rings 26 and 27 separate the in-coming flow in channel 73 from the out-going flow in channel 75 and direct the flow into channel 74. From channel 74, the in-coming flow opens into the clutch housing, but remains separate from the pressure cavity 78 previously discussed. Due to the centrifugal force occurring from the rotation of the entire K1 assembly, the colder in-coming cooling fluid is centrifuged towards the outside of the clutch housing. This movement causes the in-coming cooling flow to enter the clutch disks 31a, 31b through corresponding openings 82 in the inner disk carrier 6. As the cooling fluid moves over and between the clutch disks 31a and 31b, heat is dissipated form the disks and absorbed by the fluid. On the outer perimeter of the outer disk carrier 5, the heated cooling fluid moves into the torsional vibration damper T1 through openings 83 in the damper housing 34.4. Depending on the arrangement of the individual elements within the start-up clutch and torsional-vibration damper assembly K1, portions of the cooling flow may re-circulate from torsional vibration damper T1 back to the disk clutch L1 through the channel 81 or vice versa. The heated cooling fluid migrates through the torsional vibration damper T1 to reach channel 75 where it exits the start-up clutch and torsional-vibration damper assembly K1. Thus, this embodiment of a start-up clutch and torsional vibration damper assembly of the present invention provides a radially and axially more compact structure than the prior art which yields more efficiency and cost savings by occupying less space and having less weight.

Figure 2:
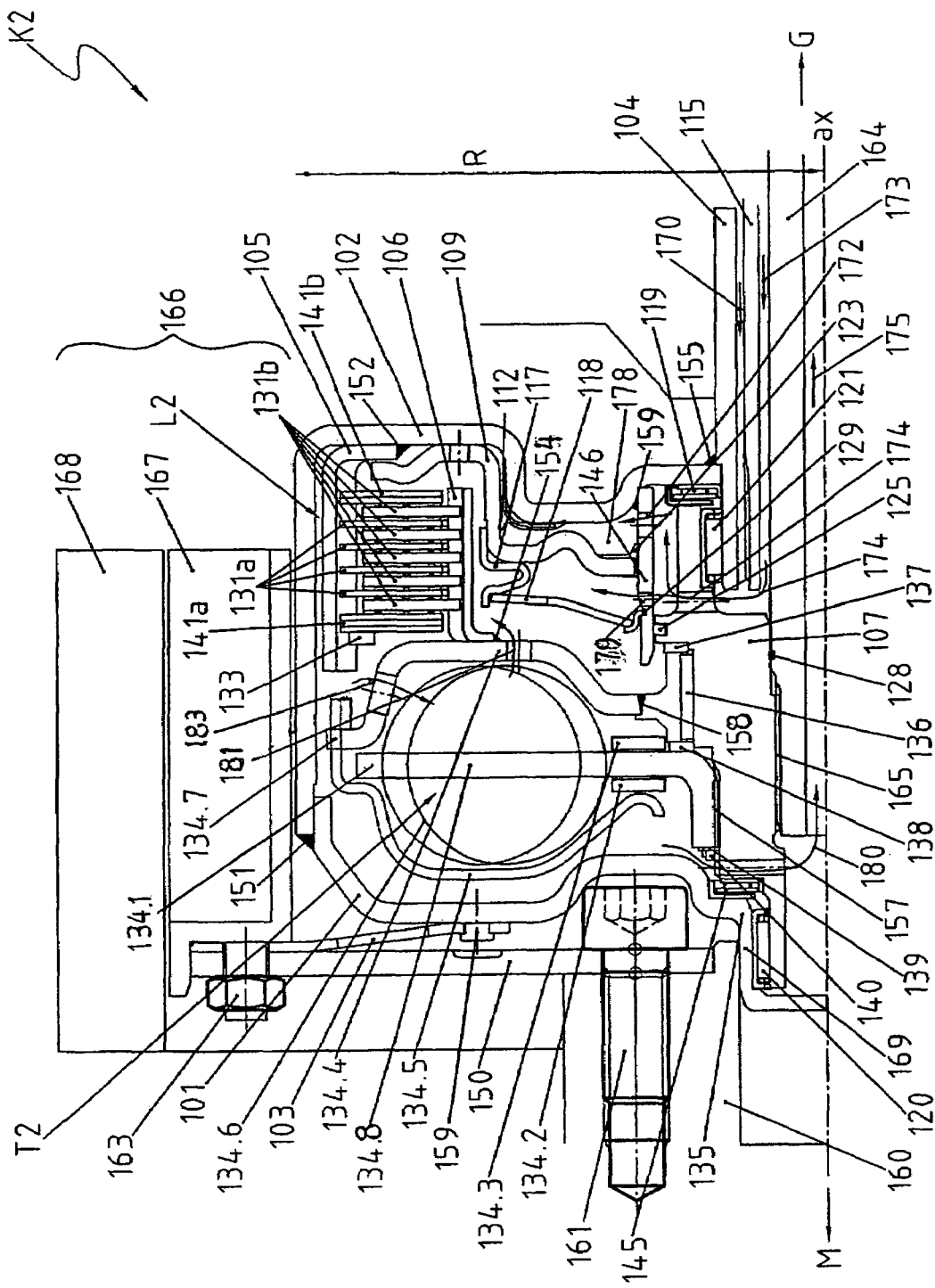
FIG. 2 is a cross sectional side view of a second embodiment of the start-up clutch and torsional-vibration damper assembly of the present invention.

Referring now to FIG. 2, where like numerals incremented by 100 are used to designate like structure, a second embodiment of the start-up clutch and torsional vibration damper of the present invention is generally indicated at K2. This start-up clutch and torsional-vibration damper assembly K2 consists of a disk clutch L2 and a torsional vibration damper T2. The disk clutch L2 and torsional vibration damper T2 are arranged next to each other in the axial direction with the disk clutch L2 on the gearbox side G and the torsional vibration damper T2 on the internal combustion motor side M. The disk clutch L2 and the torsional vibration damper T2 are connected in series and have a common axis of rotation "ax". In this embodiment, even though the torsional vibration damper T2 is closest to the motor M (not shown), the torsional moment provided from the motor M is first supplied to the disk clutch L2 and then the torsional vibration damper T2 before passing to the gearbox G (not shown).

The disk clutch L2 and the torsional vibration damper T2 are housed in a common closed clutch housing that consists of a first half shell 101 and a second half shell 102. Both half shells 101, 102 are joined together at weld joint 151. In this embodiment, a flexible disk 103 is mounted at its inner diameter to the first half shell 101 by rivets 159. The flexible disk 103 is further mounted at its outer diameter the motor flywheel 150 by bolts 163. The flywheel 150 is mounted to the motor crankshaft 160 by bolts 161. It should be appreciated that other means of attachment may also be employed to mount the flexible disk 103 to the flywheel 150, and the flywheel 150 to the crankshaft 160.

The first half shell 101 includes an input cylinder portion 135 that is operatively supported within an opening in the end of crankshaft 60. The disk clutch L2 further includes a gearbox inlet collar 107. The gearbox inlet collar 107 is supported at one end by the input cylinder 135 through a guide bushing 120 at pilot surface 169. The gearbox inlet collar 107 is operatively mounted to a portion of the torsional vibration damper T2 at a splined connection 157, as will be discussed in detail below. A guide bushing 104 is mounted to the second half shell 102 at weld joint 155. The guide bushing 104 operatively supports the gearbox inlet collar 107 through a radial bearing 121. It should be appreciated that a radial bearing could also be used in place of the guide bushing 120 and a guide bushing could be used in place of radial bearing 121.

The gearbox G includes an input shaft 164. The gearbox inlet collar 107 provides a torque-proof connection with the gearbox input shaft 164 by a splined interconnection at 165, such that the torque output through the start-up clutch and torsional-vibration damper assembly K2 is transferred to the gearbox G. An axial bearing 119 is provided between a radial wall of the second half shell 102 of the clutch housing and the gearbox inlet collar 107 to prevent axial movement of the gearbox inlet collar 107 toward the gearbox G. Similarly, axial bearing 145 is provided between a radial wall of the input cylinder portion 135 of the first half shell 101 and the gearbox inlet collar 107 to prevent axial movement of the gearbox inlet collar 107 away from the gearbox G.

The disk clutch L2 is designed as described in the above embodiment in FIG. 1 regarding disk clutch L1. The disk clutch L2 includes an outer disk carrier 105 carrying the outer disks 131a and an inner disk carrier 106 carrying the inner disks 131b. However, due to the variation in component placement of this embodiment, the outer disk carrier 105 is welded to the second half shell 102 of the clutch housing at weld 152, and the inner disk carrier 106 is welded to the torsional vibration damper T2 at weld 154. The outer disk carrier 105 also includes a pressure plate 141*b* and an end plate 141*a* that operatively enclose the clutch disks 131*a* and 131*b*.

The disk clutch L2 also includes a support cylinder 146 and an actuation plate 109. The support cylinder has the axis "ax" and is operatively connected to the second half shell 102 at weld 159. The support cylinder operatively supports the actuation plate 109, which is adapted to selectively press against the pressure plate 141*b*. The actuation plate 109 is normally biased into a non-actuated state by the spring force of return disk spring 118 and guide bushing 117 such that the disks 131*a*, 131*b* are not engaged. When the actuation plate 109 is actuated and pressed against the pressure plate 141*b*, the pressure plate 141*b* causes the outer and inner disks 131*a* and 132*b* to be pressed together against the end plate 141*a* in friction-relevant contact. This action operatively connects the outer disk carrier 105 to the inner disk carrier 106.

The torsional vibration damper T2 is designed as described in the above embodiment in FIG. 1 regarding torsional vibration damper T1. The primary element in this embodiment comprises two damper half shells 134.4, 134.5 comprising a damper shell. On the outside perimeter, these damper half shells 134.4 and 134.5 have a comb or claw interlocking 134.7 to connect the damper shells together in a torque-proof manner. The primary element is disposed about gearbox inlet collar 107 and is adapted to rotate with respect to the gearbox inlet collar 107 by means of a guide bushing 136 that supports the drive-side damper half shell 134.4. Any axial displacement of the damper half shells 134.4, 134.5 is prevented by means of two washer disks 137 and 138. It should be appreciated that a radial bearing could also be used in place of the guide bushing 136. It should be further appreciated that, as illustrated, the drive-side damper half shell 134.4 may be formed in two pieces that are operatively joined at weld 158.

The secondary element is a flanged damper disk 134.1. The secondary element 134.1 is arranged axially between and is encompassed by the two damper half shells 134.4 and 134.5. The secondary element 134.1 is generally "L-shaped" in cross-section and is mounted at its inner circumference to the gearbox inlet collar 107 at a splined connection 157.

A plurality of coil springs 134.6 are arranged circumferentially about the flanged damper disk 134.1, which is slotted to accommodate the springs such that radial legs, or drivers 134.8 extend radially outward and separate the individual springs. Similarly, the damper half shells 134.4 and 134.5 have axially opposite drivers (not shown) that are directed radially inward to engage the spring ends. In this manner, each coil spring 134.6 is supported at its ends by the radial drivers of the primary element, 134.4 and 134.5, and the radial drivers 134.8 of the secondary element 134.1. Spring separators 134.2, 134.3, which additionally support and series-connect the coil springs 134.6 are disposed on both sides of the flanged damper disk 134.1.

As discussed with regard to the embodiment of FIG. 1, in order to provide the most compact structure, and keep the installation space of the disk clutch L2 and torsional damper T2 as small as possible, the outer disk carrier 105 and the two damper half shells 134.4, 134.5 have a mainly equal outer radius R. In the preferred embodiment, the ratio of spring diameter D and the working radius W is set to 0.55. It should be appreciated that the present invention may also be structured so that the secondary element 134.1 has substantially the same outer radius R as the outer disk carrier 105.

It should be further appreciated that in addition to sizing the working radius and spring diameter to control the damping effect of the torsional damper T2, additional torsional influence can be provided by the associated components if necessary. For example, the radial bearing 136 and both washer disks 137 and 138 upon which the primary element operatively rotates can be supplied with a predetermined supplemental friction moment through the use of a spring element 139 and retaining clip 140. The spring biasing of spring element 139 would provide a longitudinal force through the splined connection 157 of the secondary element 134.1 to the washer disk 37, the radial bearing 136, and washer 137.

Operation of the start-up clutch and torsional-vibration damper assembly K2 is similar to that as previously discussed with regard to K1. A torque moment from the motor M is fed into the clutch housing 101, 102 via the flywheel 150 and flexible disk 103 and to the outer disk carrier 105. When the disk clutch L2 is actuated, the friction disks 131*a* are engaged to the steel disks 131*b* of the inner disk carrier 106. The torque input is then transferred to the damper half shells 134.4, 134.5, the coil springs 134.6 and spring separators 134.2, 134.3, the damper flange disk 134.1, and the gearbox inlet collar 107 to the gearbox inlet shaft 164 and thus into gearbox G. To actuate the disk clutch L2 and provide the supplied torque from the motor M to the gearbox G, hydraulic pressure must be selectively provided to the actuation plate 109 to cause the clutch disks 131*a* and 131*b* to engage each other.

Additionally, since the start-up clutch and torsional-vibration damper assembly K2 is subjected to extreme heat stress during an initial vehicle movement, or startup, especially under heavy loading conditions, it is important to ensure good cooling of all friction elements, and in particular the outer and inner disks 131*a*, 131*b*. For this purpose, cooling fluid flows through the entire clutch housing (half shells 101 and 102). However, in this embodiment, the hydraulic fluid flow for actuating the actuator plate 109 and for cooling the start-up clutch and torsional-vibration damper assembly K2 share the same flow paths.

A fluid discharge channel 175 is located in the middle of the gearbox inlet shaft 164. The fluid supply channel consists of two partial flow paths 173 and 170. The partial path 173 adapted to provide is located between the outer diameter of the gearbox inlet shaft 164 and the inner diameter of a secondary shaft 115. The partial path 170 is located between the outer diameter of the secondary shaft 115 and the inner diameter of the guide bushing 104. A constant supply of pressurized hydraulic fluid is routed through the two flow paths 173, 170 into the clutch housing near the disk clutch L2 by means of gaskets 128 and 125. The fluid flow enters the pressure cavity 178, but is not of sufficient pressure to overcome the return biasing force of the return spring disk 118 so that the actuating plate 109 remains un-engaged. However, for cooling purposes, the flow of hydraulic fluid passes through a plurality of small restrictor openings 179 disposed about the circumference of the support cylinder 146. Since the return spring disk 118 and guide bushing 117 are not sealed the hydraulic fluid migrates outward and due to centrifugal force is centrifuged towards the outside of the clutch housing. The fluid then enters the clutch disks 131*a*, 131*b* through corresponding openings in the inner disk carrier 106.

As the cooling fluid moves over and between the clutch disks 131*a* and 131*b*, heat is dissipated from the disks and absorbed by the fluid. On the outer perimeter of the outer disk carrier 105, the heated cooling fluid moves into the torsional vibration damper T2 through openings 183 in the damper housing 134.4. Depending on the arrangement of the individual elements within the start-up clutch and torsional-vibration damper assembly K2, portions of the cooling flow may re-circulate from torsional vibration damper T2 back to the disk clutch L2 through the channel 181 or vice versa. The heated cooling fluid migrates through the torsional vibration damper T2 to reach channel 180 where it exits the start-up clutch and torsional-vibration damper assembly K2 though the fluid discharge channel 175.

When it is desired to actuate the actuating plate 109 to engage the disk clutch L2, the hydraulic pressure supplied through the two partial flow paths 170 and 173 is increased. The increase in pressure supplied to the pressure cavity 178 is sufficient to overcome the biasing force of the return spring disk 118 so that the actuating plate 109 actuates causing the disks 131a and 131b to engage and transfer torque from the outer disk carrier 105 to the inner disk carrier 106. Due to the restrictor passages 179, any increase in fluid flow due to the higher pressure will flow into the pressure cavity 178. It should be appreciated that the increase of pressure to the hydraulic fluid supplied to the clutch housing may be supplementally supplied through either of the partial flow passages 170 and 173 or through both of the passages jointly.

Figure 9:
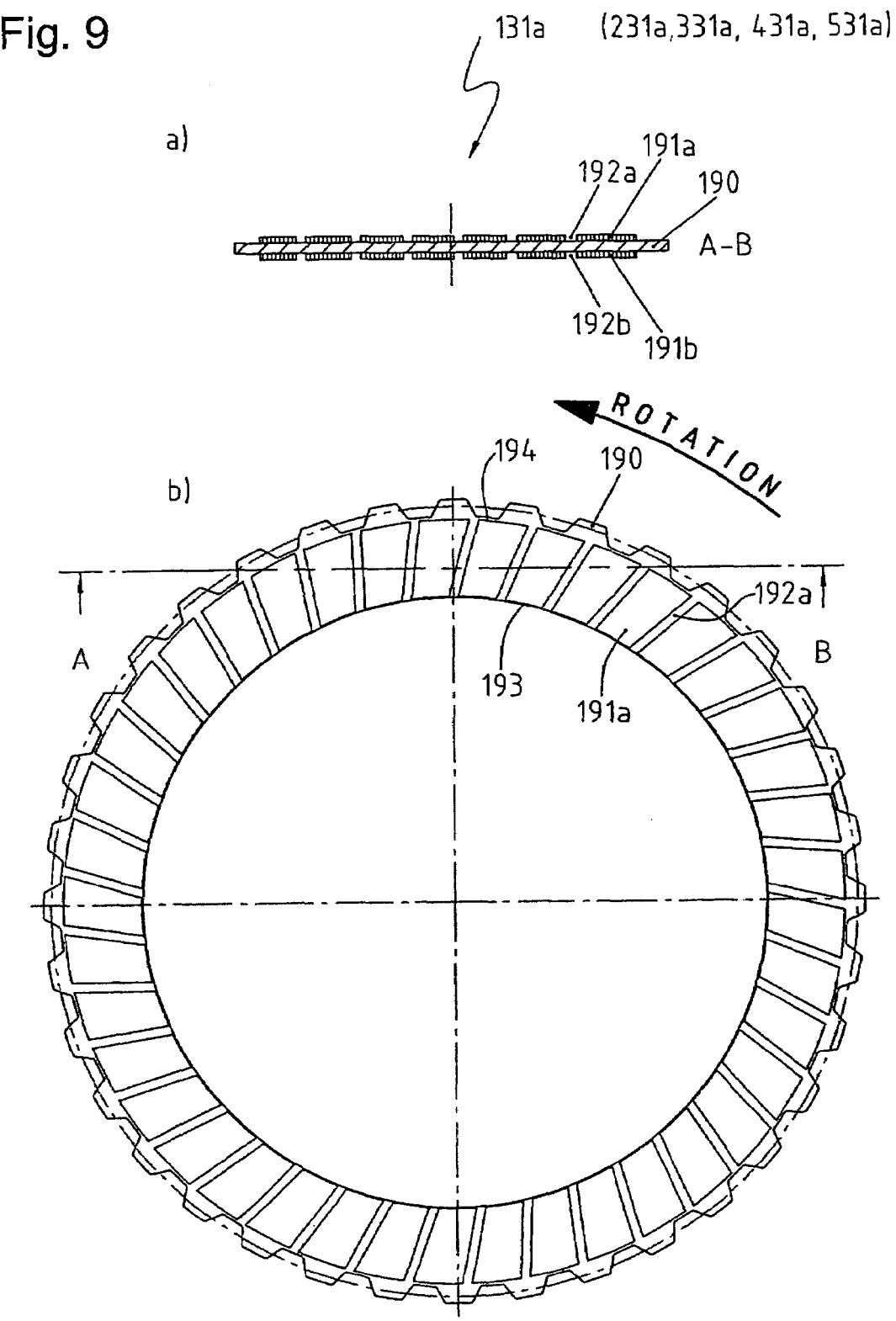

It should be appreciated that the friction disks 131a can be designed to achieve a high through-flow and higher circulation performance of cooling fluid when constructed in the form as shown in FIGS. 9a and 9b, for example. As shown, an example of one of the friction plates 131a has a base carrier plate 190 to which friction pads 191a and 191b are mounted. The friction pads 191a and 191b include grooves 192a and 192b that are formed from the inside edge 193 to the outside edge 194, whereby they run angularly against the axis of rotation from the inside to the outside. In the preferred embodiment, the angle of the groves 192a and 192b is approximately 15°. It should be further appreciated that the friction plate 131a illustrated in FIGS. 9a and 9b may also be employed in the other embodiments of the present invention as well.

As additionally illustrated in FIG. 2, this K2 embodiment of the start-up clutch and torsional-vibration damper assembly of the present invention includes a crankshaft starter generator 166 that is disposed outside the clutch housing and encompasses it coaxially. The crankshaft starter generator 166 consists of a rotor 167 and a stator 168. The rotor 167 is connected in a torque-proof manner with the outer perimeter of the flywheel 150 as well as with the flexible disk 103 by means of several bolts 163 arranged in the circumferential direction. The stator 168 is fixedly mounted to the motor. Thus, the interaction between the stationary stator 168 and the rotor 167 mounted to the start-up clutch and torsional-vibration damper assembly K2 may be electrically employed as either a motor starting device, or an electrically generating device, or both. In other words, in a first mode of operation, the crankshaft starter generator can be electrically energized to provide an input of mechanical motive force to start the motor and in a second mode the crankshaft starter generator can provide an output of generated electromotive force as it operatively rotates with the start-up clutch and torsional-vibration damper assembly K2.

Although, the addition of the crankshaft starter generator 166 causes this embodiment to be slightly radially larger than the previous K1 embodiment, the compact size of the start-up clutch and torsional-vibration damper assembly K2 is still smaller than the conventional torque converter installation space.

Figure 3:
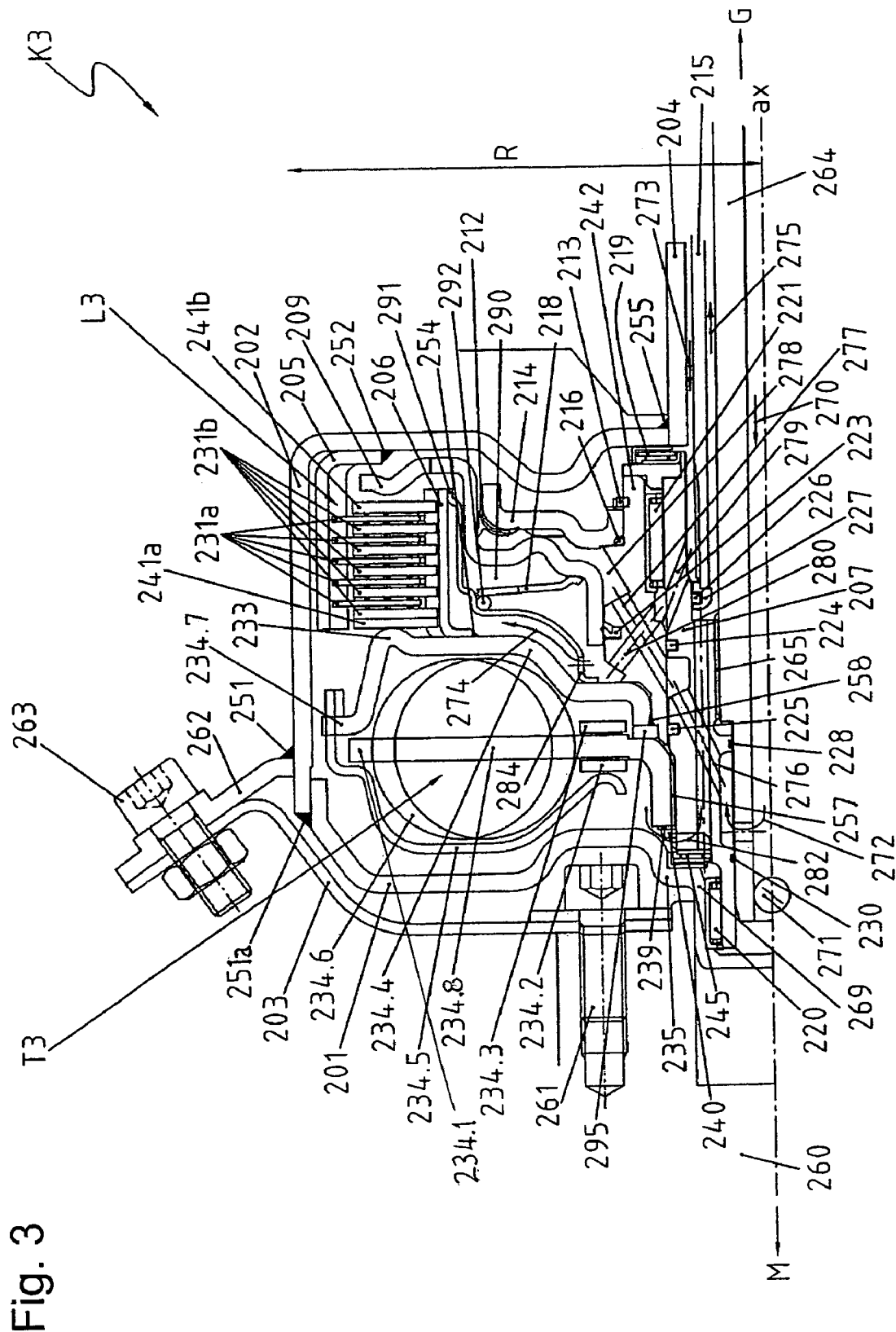
FIG. 3 is a cross sectional side view of a third embodiment of the start-up clutch and torsional-vibration damper assembly of the present invention.

Referring now to FIG. 3, where like numerals incremented by 200 are used to designate like structure, a third embodiment of the start-up clutch and torsional vibration damper of the present invention is generally indicated at K3. This start-up clutch and torsional-vibration damper assembly K3 consists of a disk clutch L3 and a torsional vibration damper T3. The disk clutch L3 and torsional vibration damper T3 are arranged next to each other in the axial direction with the disk clutch L3 on the gearbox side G and the torsional vibration damper T3 on the internal combustion motor side M. The disk clutch L3 and the torsional vibration damper T3 are connected in series and have a common axis of rotation "ax". In this embodiment, even though the torsional vibration damper T3 is closest to the motor M (not shown), the torsional moment provided from the motor M is first supplied to the disk clutch L3 and then the torsional vibration damper T3 before passing to the gearbox G (not shown).

The disk clutch L3 and the torsional vibration damper T3 are housed in a common closed clutch housing that consists of a first half shell 201 and a second half shell 202. Both half shells 201, 202 are joined together at weld joint 251a. In this embodiment, an outer ring 262 that extends diagonally outwardly from the central axis "ax" is mounted to the second half shell 202 at weld 251. A flexible disk 203 is bolted in a known manner to the ring 262 by a plurality of bolts 263. Flexible disk 203 serves to balance radial misalignments, axial oscillations, and, if necessary, radial oscillations. As illustrated, in this example, the flexible disk 203 is mounted by bolts 261 to the crankshaft 260 of the motor M.

The first half shell 201 includes an input cylinder portion 235 that is operatively supported within an opening in the end of crankshaft 260. The disk clutch L3 further includes a gearbox inlet collar 207. The gearbox inlet collar 207 is supported at one end by the input cylinder 235 through a guide bushing 220 at pilot surface 269. The gearbox inlet collar 207 is operatively mounted to a portion of the torsional vibration damper T3 at a splined connection 257, as will be discussed in detail below. A guide bushing 204 is mounted to the second half shell 202 at weld joint 255.

The gearbox G includes an input shaft 264. The gearbox inlet collar 207 provides a torque-proof connection with the gearbox input shaft 264 by a splined interconnection at 265, such that the torque output through the start-up clutch and torsional-vibration damper assembly K3 is transferred to the gearbox G. A clutch collar 242 is axially disposed about the gearbox inlet collar 207 and is rotationally supported by radial bearing 221. An axial bearing 219 is provided between a radial wall of the second half shell 202 of the clutch housing and the gearbox inlet collar 207 and the clutch collar 242 to prevent axial movement of the collars 207 and 242 toward the gearbox G. Similarly, axial bearing 245 is provided between a radial wall of the input cylinder portion 235 of the first half shell 201 and the gearbox inlet collar 207 and the clutch collar 242 to prevent axial movement of the collars 207 and 242 away from the gearbox G.

The disk clutch L3 is designed as described in the above embodiments regarding disk clutches L1 and L2. The disk clutch L3 includes an outer disk carrier 205 carrying the outer disks 231a welded to the second half shell 202 of the clutch housing at weld 252, and the inner disk carrier 206 carrying the inner disks 231b is welded to the torsional vibration damper T3 at weld 254. The outer disk carrier 205 also includes a pressure plate 241b and an end plate 241a that operatively enclose the clutch disks 231a and 231b.

The disk clutch L3 also includes an actuation plate 209, a support plate 214, and a balancing plate 254. The support plate 214 is mounted to the clutch collar 242 by a lock ring 213. The balancing plate 254 is disposed between the inner disk carrier 206 and the torsional vibration damper T3 and includes a support ring 292 and a return spring disk 218. The actuation plate 209 is operatively supported on the clutch collar 242 between the support plate 214 and the balancing plate 254 and is adapted to cause the outer and inner disks 231a and 232b to engage when actuated. The return spring disk 218 normally biases the actuation disk 209 into a non-actuated state against the support plate 214. When the actuation plate 209 is actuated and pressed against the pressure plate 241b, the pressure plate 241b causes the outer and inner disks 231a and 232b to be pressed together against the end plate 241a in friction-relevant contact. This action operatively connects the outer disk carrier 205 to the inner disk carrier 206.

The torsional vibration damper T3 is designed as described in the above embodiment in FIG. 2 regarding torsional vibration damper T2. The primary element in this embodiment comprises two damper half shells 234.4, 234.5 comprising a damper shell. On the outside perimeter, these damper half shells 234.4 and 234.5 have a comb or claw interlocking 234.7 to connect the damper shells together in a torque-proof manner. The primary element is disposed about gearbox inlet collar 207 and the clutch collar 242 and is adapted to rotate with respect to the collars 207 and 242 by means of a guide bushing 221 previously discussed. The drive-side half shell 234.4 is fixedly mounted to the clutch collar 242 at weld 258. Any axial displacement of the damper half shells 234.4, 234.5 is prevented by means of a guide bushing 295 and a spring 239 and retaining ring 240 arrangement.

The secondary element is a flanged damper disk 234.1. The secondary element 234.1 is arranged axially between and is encompassed the two damper half shells 234.4 and 234.5. The secondary element 234.1 is generally "L-shaped" in cross-section and is mounted at its inner circumference to the gearbox inlet collar 207 at a splined connection 257.

A plurality of coil springs 234.6 are arranged circumferentially about the flanged damper disk 234.1, which is slotted to accommodate the springs such that radial legs, or drivers 234.8 extend radially outward and separate the individual springs. Similarly, the damper half shells 234.4 and 234.5 have axially opposite drivers (not shown) that are directed radially inward to engage the spring ends. In this manner, each coil spring 234.6 is supported at its ends by the radial drivers of the primary element, 234.4 and 234.5, and the radial drivers 234.8 of the secondary element 234.1. Spring separators 234.2, 234.3, which additionally support and series-connect the coil springs 234.6 are disposed on both sides of the flanged damper disk 234.1.

As discussed with regard to the embodiment illustrated in FIG. 1, in order to provide the most compact structure, and keep the installation space of the disk clutch L3 and torsional damper T3 as small as possible, the outer disk carrier 205 and the two damper half shells 234.4, 234.5 have a mainly equal outer radius R. In the preferred embodiment, the ratio of spring diameter D and the working radius W is set to 0.55. It should be appreciated that the present invention may also be structured so that the secondary element 234.1 has substantially the same outer radius R as the outer disk carrier 205.

It should be further appreciated that in addition to sizing the working radius and spring diameter to control the damping effect of the torsional damper T3, additional torsional influence can be provided by the associated components if necessary. For example, a predetermined supplemental friction moment can be added to the relative rotational differences between the primary and secondary elements of the torsion vibration damper T3 by the amount of longitudinal force provided by the spring biasing of spring element 239 through the splined connection 257 of the secondary element 234.1 to the guide bushing 295 and clutch collar 242.

Operation of the start-up clutch and torsional-vibration damper assembly K3 is similar to that as previously discussed with regard to K1 and K2. A torque moment from the motor M is fed into the clutch housing 201, 202 via flexible disk 203 to the outer disk carrier 205. When the disk clutch L3 is actuated, the friction disks 231a are engaged to the steel disks 231b of the inner disk carrier 206. The torque input is then transferred to the damper half shells 234.4, 234.5, the coil springs 234.6 and spring separators 234.2, 234.3, the damper flange disk 234.1, and the gearbox inlet collar 207 to the gearbox inlet shaft 264 and thus into gearbox G.

To actuate the disk clutch L3 and provide the supplied torque from the motor M to the gearbox G, hydraulic pressure must be selectively provided to the actuation plate 209 to cause the clutch disks 231a and 231b to engage each other. In this embodiment, the gearbox inlet shaft 264 includes an open central bore 270 for the selective delivery of pressurized hydraulic fluid for actuating the actuation plate 209. The central bore 270 is closed at the motor end by a ball plug 271 so that the flow of pressurized hydraulic fluid moves through paths 272, 276, and 277 to reach pressure cavity 278. Gaskets 212, 216, 223, 224, 225, 228 and 230 prevent leakage from this flow path. The selective pressure supplied to pressure cavity 278 drives the actuation plate 209 against the spring force of the disk spring 218 and against the pressure plate 241b, which in turn pushes the clutch disks 231a, 231b together and against the end plate 241a.

Additionally, this embodiment of the present invention includes a pressure balancing area 290 that corresponds to the pressure cavity 278. This balancing area 290 is formed by the balancing plate 291, the actuation plate 209, and the return spring disk 218. During startup, centrifugal fluid pressure is created in the clutch housing. Due to the arrangement of the components within the clutch housing, the centrifugal fluid pressure will press upon the actuation plate 209 and return spring disk 218 causing an uncommanded actuation or partial actuation of the disks 231a and 231b. To counter this effect, the balancing area 290 is provided which captures a portion of hydraulic fluid such that the corresponding centrifugal fluid pressure that builds in the balancing area 290 during startup "balances" against the centrifugal fluid pressure acting upon the actuating plate 209. In this manner, any uncommanded actuation or partial actuation of the actuating plate 209 and thereby the disks 231a and 231b is avoided. When an actuation is commanded, the applied pressure delivered to the actuating plate 209 is of sufficient pressure to overcome the centrifugal fluid pressure in the balancing area 290 and the biasing force of the return spring disk 218 to properly execute the commanded actuation.

Additionally, to provide the proper cooling of all friction elements, and in particular the outer and inner disks 231a, 231b, cooling fluid flows through the entire clutch housing (half shells 201 and 202). In this embodiment, the constant flow of cooling media is separate from the selective flow required to actuate the disk clutch L3. As discussed with regard to the previous embodiments, to separate the incoming and out-going cooling fluid streams, a secondary shaft 215 is employed. As shown in FIG. 3, the secondary shaft 215 is disposed radially between the gearbox inlet shaft 264 and guide bushing 204. The in-coming cooling fluid is supplied through channel 273, the out-going fluid is discharged through channel 275.

More specifically, sealing ring 226 separates the in-coming flow in channel 273 from the out-going flow in channel 275 and directs the flow into channels 279 and 280. From channel 280, the in-coming flow passes through opening 284. Due to the centrifugal force occurring from the rotation of the entire K3 assembly, the colder in-coming cooling fluid is centrifuged along path 274 towards the outside of the clutch housing. This movement causes the in-coming cooling flow to enter the clutch disks 231a, 231b through corresponding openings in the inner disk carrier 206. As the cooling fluid moves over and between the clutch disks 231a and 231b, heat is dissipated form the disks and absorbed by the fluid. On the outer perimeter of the outer disk carrier 205, the heated cooling fluid moves into the torsional vibration damper T3 through openings in the damper housing (not shown). Depending on the arrangement of the individual elements within the start-up clutch and torsional-vibration damper assembly K3, portions of the cooling flow may re-circulate from torsional vibration damper T3 back to the disk clutch L3 or vice verse. The heated cooling fluid migrates through the torsional vibration damper T3 to reach channel 282 and exits the start-up clutch and torsional-vibration damper assembly K3 through channel 275.

Figure 4:
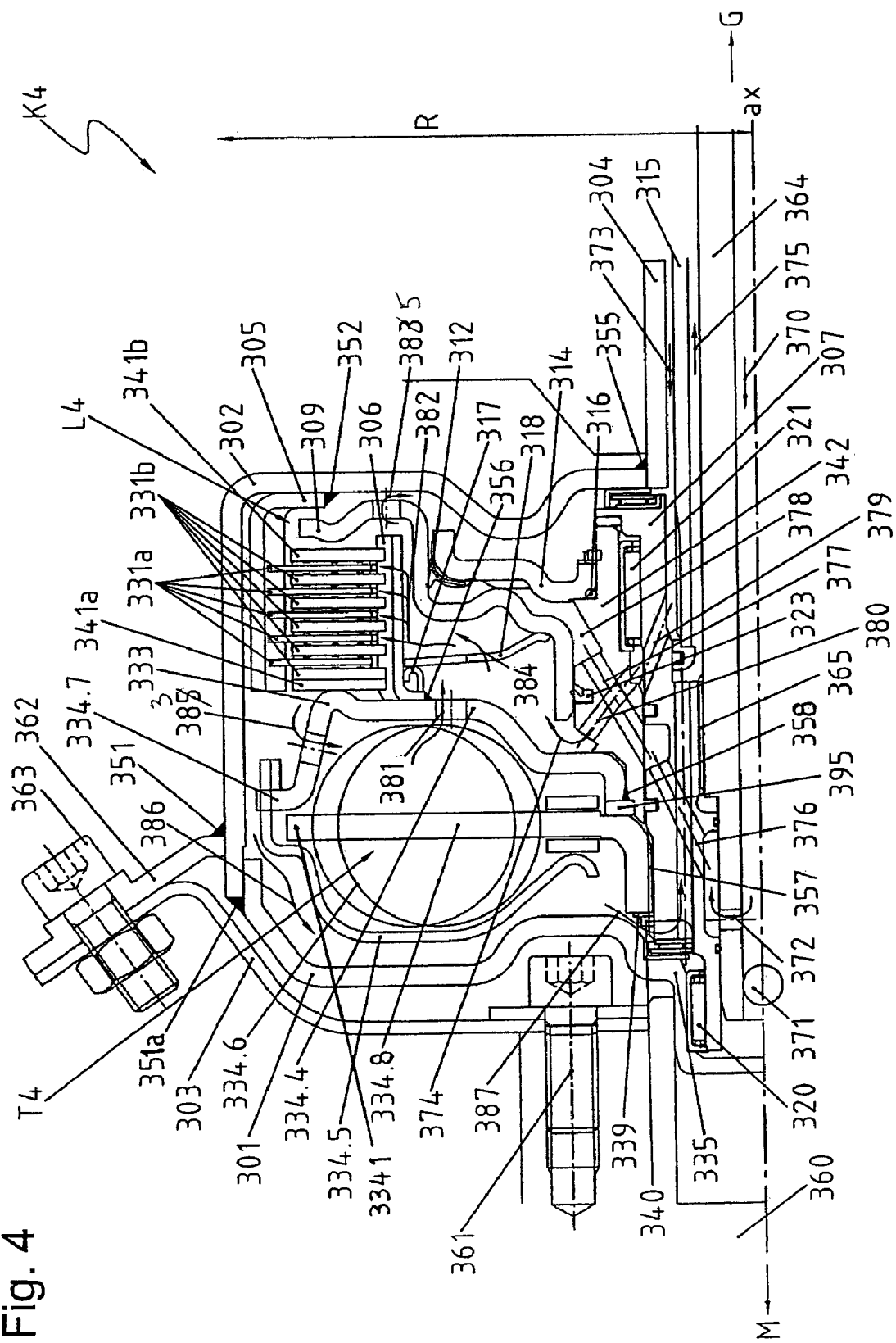
FIG. 4 is a cross sectional side view of a fourth embodiment of the start-up clutch and torsional-vibration damper assembly of the present invention.

Referring now to FIG. 4, where like numerals incremented by 300 are used to designate like structure, a fourth embodiment of the start-up clutch and torsional vibration damper of the present invention is generally indicated at K4. This start-up clutch and torsional-vibration damper assembly K4 consists of a disk clutch L4 and a torsional vibration damper T4. The disk clutch L4 and torsional vibration damper T4 are arranged next to each other in the axial direction with the disk clutch L4 on the gearbox side G and the torsional vibration damper T4 on the internal combustion motor side M. The disk clutch L4 and the torsional vibration damper T4 are connected in series and have a common axis of rotation "ax". In this embodiment, even though the torsional vibration damper T4 is closest to the motor M (not shown), the torsional moment provided from the motor M is first supplied to the disk clutch L4 and then the torsional vibration damper T4 before passing to the gearbox G (not shown).

The disk clutch L4 and the torsional vibration damper T4 are housed in a common closed clutch housing that consists of a first half shell 301 and a second half shell 302. Both half shells 301, 302 are joined together at weld joint 351a. In this embodiment, an outer ring 362 that extends diagonally outwardly from the central axis "ax" is mounted to the second half shell 302 at weld 351. A flexible disk 303 is bolted in a known manner to the ring 362 by a plurality of bolts 363. Flexible disk 303 serves to balance radial misalignments, axial oscillations, and, if necessary, radial oscillations. As illustrated, in this example, the flexible disk 303 is mounted by bolts 361 to the crankshaft 360 of the motor M.

The first half shell 301 includes an input cylinder portion 335 that is operatively supported within an opening in the end of crankshaft 360. The disk clutch L4 further includes a gearbox inlet collar 307. The gearbox inlet collar 307 is supported at one end by the input cylinder 335 through a guide bushing 320. The gearbox inlet collar 307 is operatively mounted to a portion of the torsional vibration damper T4 at a splined connection 357, as will be discussed in detail below. A guide bushing 304 is mounted to the second half shell 302 at weld joint 355.

The gearbox G includes an input shaft 364. The gearbox inlet collar 307 provides a torque-proof connection with the gearbox input shaft 364 by a splined interconnection at 365, such that the torque output through the start-up clutch and torsional-vibration damper assembly K4 is transferred to the gearbox G. A clutch collar 342 is axially disposed about the gearbox inlet collar 307 and is rotationally supported by radial bearing 321.

The disk clutch L4 is designed as described in the above embodiments regarding disk clutches L1, L2 and L3. The disk clutch L4 includes an outer disk carrier 305 carrying the outer disks 331a welded to the second half shell 302 of the clutch housing at weld 352, and the inner disk carrier 306 carrying the inner disks 331b is welded to the torsional vibration damper T4 at weld 354. The outer disk carrier 305 also includes a pressure plate 341b and an end plate 341a that operatively enclose the clutch disks 331a and 331b.

The disk clutch L4 also includes an actuation plate 309, a support plate 314, a guide plate 317, and a return spring disk 318. The actuation plate 309 is operatively supported on the clutch collar 342 and is adapted to cause the outer and inner disks 331a and 332b to engage when actuated. The actuation plate 309 is normally biased into a non-actuated state by the spring force of return disk spring 318 and guide bushing 317 such that the disks 331a, 331b are not engaged. When the actuation plate 309 is actuated and pressed against the pressure plate 341b, the pressure plate 341b causes the outer and inner disks 331a and 332b to be pressed together against the end plate 341a in friction-relevant contact. This action operatively connects the outer disk carrier 305 to the inner disk carrier 306.

The torsional vibration damper T4 is designed as described in the above embodiments regarding torsional vibration dampers T2 and T3. The primary element in this embodiment comprises two damper half shells 334.4, 334.5 comprising a damper shell. On the outside perimeter, these damper half shells 334.4 and 334.5 have a comb or claw interlocking 334.7 to connect the damper shells together in a torque-proof manner. The primary element is disposed about gearbox inlet collar 307 and the clutch collar 342 and is adapted to rotate with respect to the collars 307 and 342 by means of a guide bushing 321 previously discussed. The drive-side half shell 334.4 is fixedly mounted to the clutch collar 342 at weld 358. Any axial displacement of the damper half shells 334.4, 334.5 is prevented by means of a guide bushing 395 and a spring 339 and retaining ring 340 arrangement.

The secondary element is a flanged damper disk 334.1. The secondary element 334.1 is arranged axially between and is encompassed the two damper half shells 334.4 and 334.5. The secondary element 334.1 is generally "L-shaped" in cross-section and is mounted at its inner circumference to the gearbox inlet collar 307 at a splined connection 357.

A plurality of coil springs 334.6 are arranged circumferentially about the flanged damper disk 334.1, which is slotted to accommodate the springs such that radial legs, or drivers 334.8 extend radially outward and separate the individual springs. Similarly, the damper half shells 334.4 and 334.5 have axially opposite drivers (not shown) that are directed radially inward to engage the spring ends. In this manner, each coil spring 334.6 is supported at its ends by the radial drivers of the primary element, 334.4 and 334.5, and the radial drivers 334.8 of the secondary element 334.1.

As discussed with regard to the embodiment illustrated in FIG. 1, in order to provide the most compact structure, and keep the installation space of the disk clutch L4 and torsional damper T4 as small as possible, the outer disk carrier 305 and the two damper half shells 334.4, 334.5 have a mainly equal outer radius R. In the preferred embodiment, the ratio of spring diameter D and the working radius W is set to 0.55. It should be appreciated that the present invention may also be structured so that the secondary element 334.1 has substantially the same outer radius R as the outer disk carrier 305.

It should be further appreciated that in addition to sizing the working radius and spring diameter to control the damping effect of the torsional damper T4, additional torsional influence can be provided by the associated components if necessary. For example, a predetermined supplemental friction moment can be added to the relative rotational differences between the primary and secondary elements of the torsion vibration damper T4 by the amount of longitudinal force provided by the spring biasing of spring element 339 through the splined connection 357 of the secondary element 334.1 to the guide bushing 395 and clutch collar 342.

Operation of the start-up clutch and torsional-vibration damper assembly K4 is similar to that as previously discussed with regard to K1, K2, and K3. A torque moment from the motor M is fed into the clutch housing 301, 302 via the flexible disk 303 to the outer disk carrier 305. When the disk clutch L4 is actuated, the friction disks 331a are engaged to the steel disks 331b of the inner disk carrier 306. The torque input is then transferred to the damper half shells 334.4, 334.5, the coil springs 334.6 and spring separators, the damper flange disk 334.1, and the gearbox inlet collar 307 to the gearbox inlet shaft 364 and thus into gearbox G.

To actuate the disk clutch L4 and provide the supplied torque from the motor M to the gearbox G, hydraulic pressure must be selectively provided to the actuation plate 309 to cause the clutch disks 331a and 331b to engage each other. In this embodiment, the gearbox inlet shaft 364 includes an open central bore 370 for the selective delivery of pressurized hydraulic fluid for actuating the actuation plate 309. The central bore 370 is closed at the motor end by a ball plug 371 so that the flow of pressurized hydraulic fluid moves through paths 372, 376, and 377 to reach pressure cavity 378. Gaskets 312, 316, and 323 assist in preventing leakage from this flow path. The selective pressure supplied to pressure cavity 378 drives the actuation plate 309 against the spring force of the disk spring 318 and guide plate 317, which in turn pushes the clutch disks 331a, 331b together and against the end plate 341a.

Additionally, to provide the proper cooling of all friction elements, and in particular the outer and inner disks 331a, 331b, cooling fluid flows through the entire clutch housing (half shells 301 and 302). In this embodiment, the constant flow of cooling media is separate from the selective flow required to actuate the disk clutch L4. As discussed with regard to the previous embodiments, to separate the in-coming and out-going cooling fluid streams, a secondary shaft 315 is employed. As shown in FIG. 4, the secondary shaft 315 is disposed radially between the gearbox inlet shaft 364 and guide bushing 304. The in-coming cooling fluid is supplied through channel 373, the out-going fluid is discharged through channel 375.

More specifically, the in-coming cooling flow is directed from channel 373. The flow then passes through openings 384 in the return spring disk 318 to enter the clutch disks 331a, 331b through corresponding openings in the inner disk carrier 306. As the cooling fluid moves over and between the clutch disks 331a and 331b, heat is dissipated form the disks and absorbed by the fluid. The cooling fluid moves around the clutch housing and into the torsional vibration damper T4 through openings 381, 383, and 385. The flow continues about moving about the clutch housing and ultimately exits the start-up clutch and torsional-vibration damper assembly K4 through paths 386 and 387 to reach the out-going channel 375.

Figure 5:
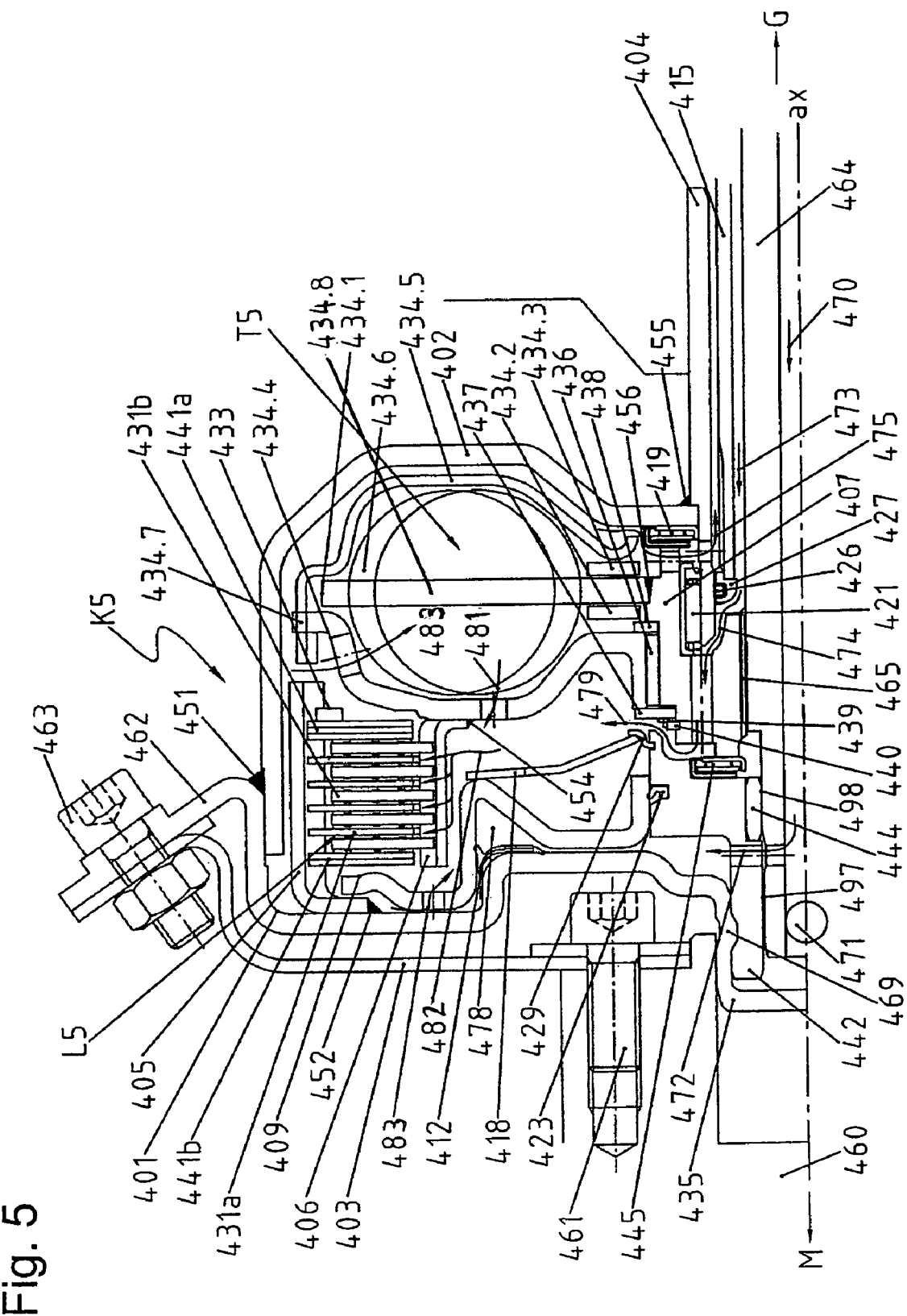
FIG. 5 is a cross sectional side view of a fifth embodiment of the start-up clutch and torsional-vibration damper assembly of the present invention.

Referring now to FIG. 5, where like numerals incremented by 400 are used to designate like structure, a fifth embodiment of the start-up clutch and torsional vibration damper of the present invention is generally indicated at K5. This start-up clutch and torsional-vibration damper assembly K5 consists of a disk clutch L5 and a torsional vibration damper T5. The disk clutch L5 and torsional vibration damper T5 are arranged next to each other in the axial direction with the disk clutch L5 on the internal combustion motor side M and the torsional vibration damper T5 on the gearbox side G. The disk clutch L5 and the torsional vibration damper T5 are connected in series and have a common axis of rotation "ax". In this embodiment, the torsional moment provided from the motor M is first supplied to the disk clutch L5 and then the torsional vibration damper T5 before passing to the gearbox G (not shown).

The disk clutch L5 and the torsional vibration damper T5 are housed in a common closed clutch housing that consists of a first half shell 401 and a second half shell 402. Both half shells 401, 402 are joined together at weld joint 451. In this embodiment, first half shell 401 includes an outer ring 462 that extends diagonally outwardly from the central axis "ax". A flexible disk 403 is bolted in a known manner to the ring 462 by a plurality of bolts 463. As illustrated, the flexible disk 403 is mounted by bolts 461 to the crankshaft 460 of the motor M. The end of crankshaft 460 includes an opening that operatively supports an input cylinder portion 435 of the first half shell 401.

The gearbox G includes an input shaft 464 and the disk clutch L5 includes a clutch collar 442 that is supported at one end between the input cylinder 435 and a seal 497 disposed upon the end of the gearbox input shaft 464. The clutch collar 442 is further supported on the gearbox inlet shaft 464 through a guide bushing 440 at pilot surface 498. A guide bushing 404 extends into the gearbox G and is mounted to the second half shell 402 at weld joint 455. A gearbox inlet collar 407 is axially disposed about the gearbox input shaft 464 and the guide bushing 404 and is rotationally supported by radial bearing 421. The gearbox inlet collar 407 has a torque-proof connection with the gearbox input shaft 464 by a splined interconnection at 465 and is further operatively mounted to a portion of the torsional vibration damper T5 at weld 456, as will be discussed in detail below.

The disk clutch L5 is designed as described in the above embodiments regarding disk clutches L1, L2, L3, and L4. The disk clutch L5 includes an outer disk carrier 405 carrying the outer disks 431a welded to the second half shell 402 of the clutch housing at weld 452, and the inner disk carrier 406 carrying the inner disks 431b is welded to the torsional vibration damper T5 at weld 454. The outer disk carrier 405 also includes a pressure plate 441b and an end plate 441a that operatively enclose the clutch disks 431a and 431b.

The disk clutch L5 also includes an actuation plate 409 and a return spring disk 418. The actuation plate 409 is operatively supported on the clutch collar 442 by retaining ring 429 and is adapted to cause the outer and inner disks 431a and 432b to engage when actuated. The actuation plate 409 is normally biased into a non-actuated state by the spring force of return disk spring 418 such that the disks 431a, 431b are not engaged. When the actuation plate 409 is actuated and pressed against the pressure plate 441b, the pressure plate 441b causes the outer and inner disks 431a and 432b to be pressed together against the end plate 441a in friction-relevant contact. This action operatively connects the outer disk carrier 405 to the inner disk carrier 406.

The torsional vibration damper T5 is designed as described in the above embodiments regarding torsional vibration dampers T2, T3, and T4. The primary element in this embodiment comprises two damper half shells 434.4, 434.5 comprising a damper shell. On the outside perimeter, these damper half shells 434.4 and 434.5 have a comb or claw interlocking 434.7 to connect the damper shells together in a torque-proof manner. The primary element is disposed about the gearbox inlet collar 407 and is adapted to rotate with respect to the inlet collar 407 by means of a guide bushing 438. Any axial displacement of the damper half shells 434.4, 434.5 is prevented by means of two washer disks 437 and 438 with a spring 439 and retaining ring 440 arrangement.

The secondary element is a flanged damper disk 434.1. The secondary element 434.1 is arranged axially between and is encompassed the two damper half shells 434.4 and 434.5. The secondary element 434.1 is mounted at its inner circumference to the gearbox inlet collar 407 at weld joint 456. A plurality of coil springs 434.6 are arranged circumferentially about the flanged damper disk 434.1, which is slotted to accommodate the springs such that radial legs, or drivers 434.8 extend radially outward and separate the individual springs. Similarly, the damper half shells 434.4 and 434.5 have axially opposite drivers (not shown) that are directed radially inward to engage the spring ends. In this manner, each coil spring 434.6 is supported at its ends by the radial drivers of the primary element, 434.4 and 434.5, and the radial drivers 434.8 of the secondary element 434.1.

As discussed with regard to the embodiment illustrated in FIG. 1, in order to provide the most compact structure, and keep the installation space of the disk clutch L5 and torsional damper T5 as small as possible, the outer disk carrier 405 and the two damper half shells 434.4, 434.5 have a mainly equal outer radius R. In the preferred embodiment, the ratio of spring diameter D and the working radius W is set to 0.55. It should be appreciated that the present invention may also be structured so that the secondary element 434.1 has substantially the same outer radius R as the outer disk carrier 405.

It should be further appreciated that in addition to sizing the working radius and spring diameter to control the damping effect of the torsional damper T5, additional torsional influence can be provided by the associated components if necessary. For example, a predetermined supplemental friction moment can be added to the relative rotational differences between the primary and secondary elements of the torsion vibration damper T5 by the amount of longitudinal force provided by the spring biasing of spring element 439 to the primary element 434.7 and its washers 437 and 438.

Operation of the start-up clutch and torsional-vibration damper assembly K5 is similar to that as previously discussed with regard to K1, K2, K3, and K4. A torque moment from the motor M is fed into the clutch housing 401, 402 via the flexible disk 403 to the outer disk carrier 405. When the disk clutch L5 is actuated, the friction disks 431a are engaged to the steel disks 431b of the inner disk carrier 406. The torque input is then transferred to the damper half shells 434.4, 434.5, the coil springs 434.6 and spring separators 434.2, 434.3, the damper flange disk 434.1, and the gearbox inlet collar 407 to the gearbox inlet shaft 464 and thus into gearbox G.

To actuate the disk clutch L5 and provide the supplied torque from the motor M to the gearbox G, hydraulic pressure must be selectively provided to the actuation plate 409 to cause the clutch disks 431a and 431b to engage each other. In this embodiment, the gearbox inlet shaft 464 includes an open central bore 470 for the selective delivery of pressurized hydraulic fluid for actuating the actuation plate 409. The central bore 470 is closed at the motor end by a ball plug 471 so that the flow of pressurized hydraulic fluid moves through path 472 to reach pressure cavity 478. Gaskets 412 and 423 assist in preventing leakage from this flow path. The selective pressure supplied to pressure cavity 478 drives the actuation plate 409 against the spring force of the disk spring 418, which in turn pushes the clutch disks 431a, 431b together and against the end plate 441a.

Additionally, to provide the proper cooling of all friction elements, and in particular the outer and inner disks 431a, 431b, cooling fluid flows through the entire clutch housing (half shells 401 and 402). In this embodiment, the constant flow of cooling media is separate from the selective flow required to actuate the disk clutch L5. As discussed with regard to the previous embodiments, to separate the in-coming and out-going cooling fluid streams, a secondary shaft 415 is employed. As shown in FIG. 5, the secondary shaft 415 is disposed radially between the gearbox inlet shaft 464 and guide bushing 404. The in-coming cooling fluid is supplied through channel 473, the out-going fluid is discharged through channel 475.

More specifically, the in-coming cooling flow is directed though channel 473 and flow paths 474 and 479 to enter the clutch disks 431a, 431b through corresponding openings 482 in the inner disk carrier 406. As the cooling fluid moves over and between the clutch disks 431a and 431b, heat is dissipated form the disks and absorbed by the fluid. The cooling fluid moves around the clutch housing and into the torsional vibration damper T5 through openings 481, 483, and 485. The flow continues about moving about the clutch housing and ultimately exits the start-up clutch and torsional-vibration damper assembly K5 through the out-going channel 475.

Figure 6:
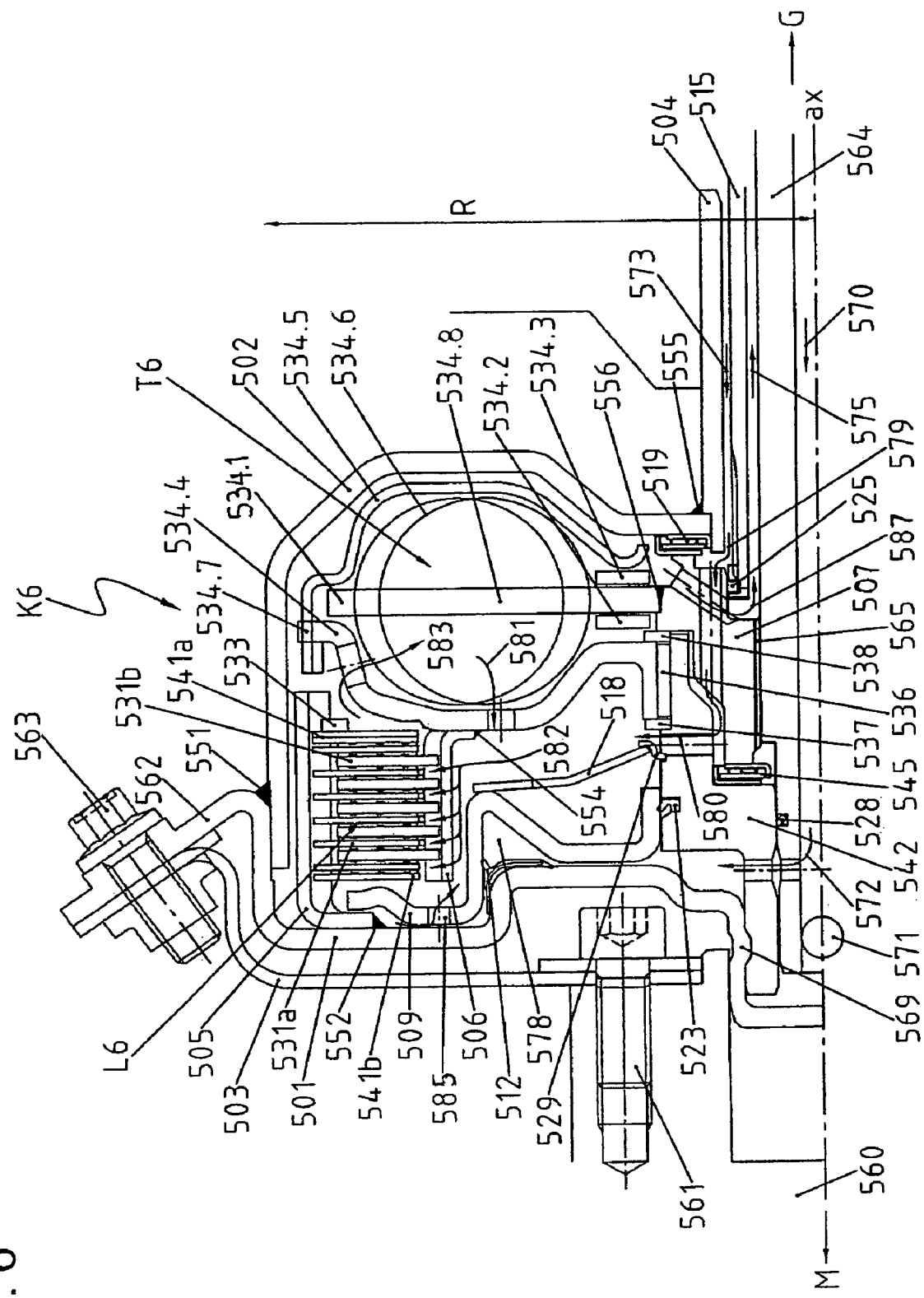
FIG. 6 is a cross sectional side view of a sixth embodiment of the start-up clutch and torsional-vibration damper assembly of the present invention.

Referring now to FIG. 6, where like numerals incremented by 500 are used to designate like structure, a sixth embodiment of the start-up clutch and torsional vibration damper of the present invention is generally indicated at K6. This start-up clutch and torsional-vibration damper assembly K6 consists of a disk clutch L6 and a torsional vibration damper T6. The disk clutch L6 and torsional vibration damper T6 are arranged next to each other in the axial direction with the disk clutch L6 on the internal combustion motor side M and the torsional vibration damper T6 on the gearbox side G. The disk clutch L6 and the torsional vibration damper T6 are connected in series and have a common axis of rotation "ax". In this embodiment, the torsional moment provided from the motor M is first supplied to the disk clutch L6 and then the torsional vibration damper T6 before passing to the gearbox G (not shown).

The disk clutch L6 and the torsional vibration damper T6 are housed in a common closed clutch housing that consists of a first half shell 501 and a second half shell 502. Both half shells 501, 502 are joined together at weld joint 551. In this embodiment, first half shell 501 includes an outer ring 562 that extends diagonally outwardly from the central axis "ax". A flexible disk 503 is bolted in a known manner to the ring 562 by a plurality of bolts 563. As illustrated, the flexible disk 503 is mounted by bolts 561 to the crankshaft 560 of the motor M. The end of crankshaft 560 includes an opening that operatively supports an input cylinder portion 535 of the first half shell 501.

The gearbox G includes an input shaft 564 and the disk clutch L6 includes a clutch collar 542 that is supported at one end between the input cylinder 535 and the end of the gearbox input shaft 564. A guide bushing 504 extends into the gearbox G and is mounted to the second half shell 502 at weld joint 555. A gearbox inlet collar 507 is axially disposed about the gearbox input shaft 564 and is rotationally supported by radial bearing 521. The gearbox inlet collar 507 has a torque-proof connection with the gearbox input shaft 564 by a splined interconnection at 565 and is further operatively mounted to a portion of the torsional vibration damper T6 at weld 556, as will be discussed in detail below.

The disk clutch L6 is designed as described in the above embodiments regarding disk clutches L1, L2, L3, L4, and L5. The disk clutch L6 includes an outer disk carrier 505 carrying the outer disks 531a welded to the second half shell 502 of the clutch housing at weld 552, and the inner disk carrier 506 carrying the inner disks 531b is welded to the torsional vibration damper T6 at weld 554. The outer disk carrier 505 also includes a pressure plate 541b and an end plate 541a that operatively enclose the clutch disks 531a and 531b.

The disk clutch L6 also includes an actuation plate 509 and a return spring disk 518. The actuation plate 509 is operatively supported on the clutch collar 542 by retaining ring 529 and is adapted to cause the outer and inner disks 531a and 532b to engage when actuated. The actuation plate 509 is normally biased into a non-actuated state by the spring force of return disk spring 518 such that the disks 531a, 531b are not engaged. When the actuation plate 509 is actuated and pressed against the pressure plate 541b, the pressure plate 541b causes the outer and inner disks 531a and 532b to be pressed together against the end plate 541a in friction-relevant contact. This action operatively connects the outer disk carrier 505 to the inner disk carrier 506.

The torsional vibration damper T6 is designed as described in the above embodiments regarding torsional vibration dampers T2, T3, T4 and T5. The primary element in this embodiment comprises two damper half shells 534.4, 534.5 comprising a damper shell. On the outside perimeter, these damper half shells 534.4 and 534.5 have a comb or claw interlocking 534.7 to connect the damper shells together in a torque-proof manner. The primary element is disposed about the gearbox inlet collar 507 and is adapted to rotate with respect to the inlet collar 507 by means of a guide bushing 536. Any axial displacement of the damper half shells 534.4, 534.5 is prevented by means of two washer disks 537 and 538 with a spring 539 and retaining ring 540 arrangement.

The secondary element is a flanged damper disk 534.1. The secondary element 534.1 is arranged axially between and is encompassed the two damper half shells 534.4 and 534.5. The secondary element 534.1 is mounted at its inner circumference to the gearbox inlet collar 507 at weld joint 556. A plurality of coil springs 534.6 are arranged circumferentially about the flanged damper disk 534.1, which is slotted to accommodate the springs such that radial legs, or drivers 534.8 extend radially outward and separate the individual springs. Similarly, the damper half shells 534.4 and 534.5 have axially opposite drivers (not shown) that are directed radially inward to engage the spring ends. In this manner, each coil spring 534.6 is supported at its ends by the radial drivers of the primary element, 534.4 and 534.5, and the radial drivers 534.8 of the secondary element 534.1.

As discussed with regard to the embodiment illustrated in FIG. 1, in order to provide the most compact structure, and keep the installation space of the disk clutch L6 and torsional damper T6 as small as possible, the outer disk carrier 505 and the two damper half shells 534.4, 534.5 have a mainly equal outer radius R. In the preferred embodiment, the ratio of spring diameter D and the working radius W is set to 0.55. It should be appreciated that the present invention may also be structured so that the secondary element 534.1 has substantially the same outer radius R as the outer disk carrier 505.

It should be further appreciated that in addition to sizing the working radius and spring diameter to control the damping effect of the torsional damper T6, additional torsional influence can be provided by the associated components if necessary. For example, a predetermined supplemental friction moment can be added to the relative rotational differences between the primary and secondary elements of the torsion vibration damper T6 by the amount of longitudinal force provided by the spring biasing of spring element 539 to the primary element 534.7 and its washers 537 and 538.

Operation of the start-up clutch and torsional-vibration damper assembly K6 is similar to that as previously discussed with regard to K1, K2, K3, K4, and K5. A torque moment from the motor M is fed into the clutch housing 501, 502 via the flexible disk 503 to the outer disk carrier 505. When the disk clutch L6 is actuated, the friction disks 531a are engaged to the steel disks 531b of the inner disk carrier 506. The torque input is then transferred to the damper half shells 534.4, 534.5, the coil springs 534.6 and spring separators 534.2, 534.3, the damper flange disk 534.1, and the gearbox inlet collar 507 to the gearbox inlet shaft 564 and thus into gearbox G.

To actuate the disk clutch L6 and provide the supplied torque from the motor M to the gearbox G, hydraulic pressure must be selectively provided to the actuation plate 509 to cause the clutch disks 531a and 531b to engage each other. In this embodiment, the gearbox inlet shaft 564 includes an open central bore 570 for the selective delivery of pressurized hydraulic fluid for actuating the actuation plate 509. The central bore 570 is closed at the motor end by a ball plug 571 so that the flow of pressurized hydraulic fluid moves through path 572 to reach pressure cavity 578. Gaskets 512 and 523 assist in preventing leakage from this flow path. The selective pressure supplied to pressure cavity 578 drives the actuation plate 509 against the spring force of the disk spring 518, which in turn pushes the clutch disks 531a, 531b together and against the end plate 541a.

Additionally, to provide the proper cooling of all friction elements, and in particular the outer and inner disks 531a, 531b, cooling fluid flows through the entire clutch housing (half shells 501 and 502). In this embodiment, the constant flow of cooling media is separate from the selective flow required to actuate the disk clutch L6. As discussed with regard to the previous embodiments, to separate the incoming and out-going cooling fluid streams, a secondary shaft 515 is employed. As shown in FIG. 6, the secondary shaft 515 is disposed radially between the gearbox inlet shaft 564 and guide bushing 504. The in-coming cooling fluid is supplied through channel 573, the out-going fluid is discharged through channel 575.

More specifically, the in-coming cooling flow is directed though channel 573 and flow paths 579 and 580 to enter the clutch disks 531a, 531b through corresponding openings 582 in the inner disk carrier 506. As the cooling fluid moves over and between the clutch disks 531a and 531b, heat is dissipated form the disks and absorbed by the fluid. The cooling fluid moves around the clutch housing and into the torsional vibration damper T6 through openings 581, 583, and 585. The flow continues about moving about the clutch housing and ultimately exits the start-up clutch and torsional-vibration damper assembly K6 through the out-going channel 575.

Figure 7:
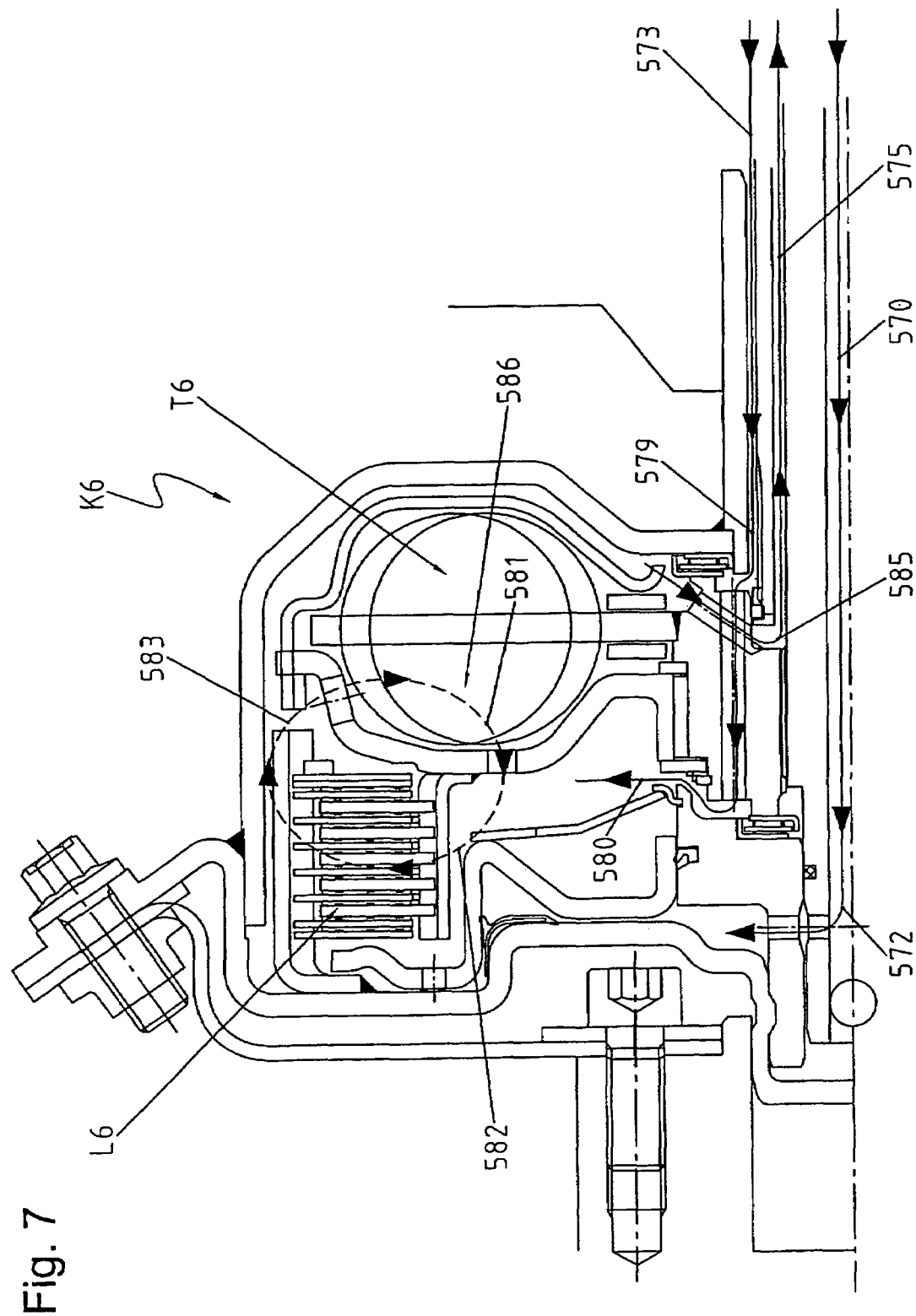
FIG. 7 is a illustration of the flow of cooling fluid with the start-up clutch and torsional-vibration damper assembly of the present invention.

It is advantageous to design the disks 531a, 531b, and the components inside the clutch housing 501, 502 in a suitable manner so that they steer the cooling fluid within the clutch housing 501, 502 such that the cooling fluid is circulated within the clutch housing 501, 502. This type of circulation flow is generally indicated at 586 in FIG. 7, which shows the clutch assembly K6 of FIG. 6. In the preferred embodiment, to achieve the desired cooling of the components of the present invention, a flow of cooling fluid between 3 to 10 liters per minute is provided to the clutch housing 501, 502. It should be appreciated that the manner of cooling flow illustrated in FIG. 7 is applicable to all the embodiments discussed herein.

In this manner, the costly and inefficient approaches of the prior art of combining conventional start-up clutches with conventional torsional vibration dampers are overcome by the present invention. The embodiments of the present invention provide start-up clutch and torsional vibration damper assemblies that are radially and axially more compact than conventional designs to provide more efficiency and cost savings by occupying less space and having less weight than conventional designs. Furthermore, each of these embodiments of the present invention provides a more compact and lighter start-up clutch and a torsional vibration damper assembly that is encompassed within an enclosed housing that provides a cooling media to dissipate the higher frictional heat output generated by this more compact and efficient design.

It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A start-up clutch and torsional-vibration damper assembly comprising:
    a disk clutch having an outer disk carrier and an inner disk carrier;
    a torsional vibration damper having a primary element, a secondary element, and a spring dampening mechanism disposed between and operatively coupling said primary element and said secondary element;
    said torsional vibration damper connected in series to said disk clutch such that said torsional vibration damper and said disk clutch are juxtaposed to each other along a common axis, said primary element having substantially the same outside radius as said outer disk carrier, and said spring damping mechanism including at least one coil spring disposed circumferentially about said common axis and the ratio between the diameter of said at least one spring and said outside radius is in a range between 0.5 and 0.75.

2. A start-up clutch and torsional-vibration damper assembly as set forth in claim 1 wherein said spring damping mechanism further includes a plurality of coil springs disposed circumferentially about said common axis and at least one spring separator adapted to accept and retain said plurality of springs such that said at least one spring separator series-connects said plurality of springs.

3. A start-up clutch and torsional-vibration damper assembly as set forth in claim 1 wherein said disk clutch includes a first set of disks operatively mounted to one of said disk carriers and a second set of disks operatively mounted to the other of said disk carriers, said first set and said second set of disks interposed between each other and adapted to be operatively pressed together in a friction-relevant contact, each disk of one of said sets of disks further having a friction material disposed thereupon, said friction material having a plurality of grooves adapted to provide a flow path for cooling media.

4. A start-up clutch and torsional-vibration damper assembly as set forth in claim 1 wherein said disk clutch and said torsional vibration damper are operatively disposed within a closed housing made of two half shells.

5. A start-up clutch and torsional-vibration damper assembly as set forth in claim 1 which further includes a gearbox inlet collar disposed about said common axis that is adapted to provide an operative connection between said secondary element and a gearbox inlet shaft.

6. A start-up clutch and torsional-vibration damper assembly as set forth in claim 5 which further includes a spring element and retainer ring that are adapted to retain said secondary element in a rotationally operative manner about said gearbox inlet collar with respect to said primary element, said spring element further adapted to provide a predetermined friction moment to said secondary element to provide torsional dampening in addition to that provided by said spring dampening mechanism.

7. A start-up clutch and torsional-vibration damper assembly as set forth in claim 5 wherein said torsional vibration damper and said disk clutch are operatively disposed about said gearbox inlet collar.

8. A start-up clutch and torsional-vibration damper assembly as set forth in claim 5 which further includes a clutch collar disposed about said common axis such that said disk clutch is operatively mounted to said clutch collar and said torsional vibration damper is operatively mounted to said gearbox inlet collar.

9. A start-up clutch and torsional-vibration damper assembly as set forth in claim 5 which further includes a clutch collar disposed about said common axis such that said torsional vibration damper is operatively mounted to said clutch collar and said disk clutch is operatively mounted to said gearbox inlet collar.

10. A start-up clutch and torsional-vibration damper as set forth in claim 1 which further includes a flexible disk that is adapted to provide an operative connection between said assembly and a prime mover.

11. A start-up clutch and torsional-vibration damper assembly as set forth in claim 1 which further includes a crankshaft starter generator operatively mounted to said assembly, said assembly being operatively connected to a prime mover such that said crankshaft starter generator can be electrically energized to provide an input of mechanical motive force to start said prime mover and provide an output of generated electro-motive force when operatively rotating with said assembly.

12. A start-up clutch and torsional-vibration damper assembly comprising:
- a disk clutch having an outer disk carrier and an inner disk carrier;
- a torsional vibration damper having a primary element, a secondary element, and a spring dampening mechanism disposed between and operatively coupling said primary element and said secondary element;
- said torsional vibration damper connected in series to said disk clutch such that said torsional vibration damper and said disk clutch are juxtaposed to each other along a common axis, said primary element having substantially the same outside radius as said outer disk carrier, and said secondary element is a damper flange disk and said primary element is a damper shell having two damper half shells that encompasses said damper flange disk.

13. A start-up clutch and torsional-vibration damper assembly comprising:
- a disk clutch having an outer disk carrier and an inner disk carrier;
- a torsional vibration damper having a primary element, a secondary element, and a spring dampening mechanism disposed between and operatively coupling said primary element and said secondary element;
- said torsional vibration damper connected in series to said disk clutch such that said torsional vibration damper and said disk clutch are juxtaposed to each other along a common axis, said primary element having substantially the same outside radius as said outer disk carrier, and said disk clutch and said torsional vibration damper being operatively disposed within a closed housing adapted to operatively contain a flow of cooling media and said outer disk carrier mounted to said housing in a torque-proof manner.

* * * * *